United States Patent
Strosin

(10) Patent No.: US 12,336,643 B2
(45) Date of Patent: *Jun. 24, 2025

(54) REMOVABLE MODULAR ATTACHMENT SYSTEM FOR ACCESSORIES

(71) Applicant: Tecicity, LLC, Historic New Castle, DE (US)

(72) Inventor: Marek Strosin, Annandale, VA (US)

(73) Assignee: Tecicity LLC, Historic New Castle (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/386,409

(22) Filed: Nov. 2, 2023

(65) Prior Publication Data

US 2024/0206627 A1   Jun. 27, 2024

Related U.S. Application Data

(63) Continuation of application No. 17/745,833, filed on May 16, 2022, now Pat. No. 11,805,916, which is a
(Continued)

(51) Int. Cl.
*A47B 5/02* (2006.01)
*A47C 7/54* (2006.01)
(Continued)

(52) U.S. Cl.
CPC ............... *A47C 7/705* (2018.08); *A47C 7/54* (2013.01); *A47C 7/624* (2018.08); *A47C 7/725* (2013.01);
(Continued)

(58) Field of Classification Search
CPC ......... A47C 13/005; A47C 7/24; A47C 7/546; A47C 7/624; A47C 7/705; F16B 12/40; A63F 2300/1043
(Continued)

(56) References Cited

U.S. PATENT DOCUMENTS

RE25,985 E    3/1966  Klassen
3,408,032 A   10/1968 Francis
(Continued)

FOREIGN PATENT DOCUMENTS

CN    212231144 U    12/2020
DE    102007011078 A1   9/2008
(Continued)

OTHER PUBLICATIONS

European Search Report for App. No. EP 22 18 3929, Dec. 20, 2022.
(Continued)

*Primary Examiner* — Rodney B White
(74) *Attorney, Agent, or Firm* — Barcelo, Harrison & Walker LLP

(57) ABSTRACT

A modular attachment system may be provided with the ability to rapidly interchange different peripherals and accessories at different points where modular receivers have been installed. One or more modular receivers may include one or more quick-connect receptacles adapted to receive corresponding one or more quick connectors of one or more peripheral adapters to quickly connect and disconnect the modular peripheral adapters to facilitate rapid reconfiguration of chairs, desks, tables, or other furniture for different applications. A variety of peripherals and accessories can be attached to one or more modular peripheral adapters to create peripheral assemblies that can be rapidly interchanged by rapid connection to or disconnection from any installed modular housings to reconfigure furniture for different applications. The modular receivers may be attached to a desk, table, or other furnishings or manufactured as a part of office, computer, or gaming chairs, desks, tables, or other furnishings.

16 Claims, 35 Drawing Sheets

Related U.S. Application Data continuation of application No. 17/545,957, filed on Dec. 8, 2021, now Pat. No. 11,330,908.

(60) Provisional application No. 63/122,958, filed on Dec. 9, 2020.

(51) Int. Cl.
| | |
|---|---|
| *A47C 7/62* | (2006.01) |
| *A47C 7/68* | (2006.01) |
| *A47C 7/72* | (2006.01) |
| *A63F 13/245* | (2014.01) |

(52) U.S. Cl.
CPC .... *A63F 13/245* (2014.09); *A63F 2300/1043* (2013.01); *A63F 2300/8082* (2013.01)

(58) Field of Classification Search
USPC ......... 297/153, 160, 161, 162, 174 R, 440.1, 297/440.14
See application file for complete search history.

(56) References Cited

U.S. PATENT DOCUMENTS

| | | | |
|---|---|---|---|
| 3,538,522 | A | 11/1970 | Adams |
| 3,547,488 | A | 12/1970 | Barnes |
| 3,567,284 | A | 3/1971 | Miller |
| 3,586,367 | A | 6/1971 | Cincotta |
| 3,635,522 | A | 1/1972 | Kerwit |
| 4,288,122 | A | 9/1981 | Meek |
| 4,526,419 | A | 7/1985 | Bowman |
| 4,591,206 | A | 5/1986 | Pribble |
| 4,632,451 | A | 12/1986 | Lee |
| 5,246,240 | A | 9/1993 | Romich |
| 5,393,124 | A | 2/1995 | Neil |
| 5,765,911 | A | 6/1998 | Sorenson |
| 5,845,964 | A | 12/1998 | Phoon |
| 5,899,526 | A | 5/1999 | LaPointe |
| 5,909,864 | A | 6/1999 | Wang |
| 5,954,393 | A | 9/1999 | Perrin |
| 6,045,179 | A | 4/2000 | Harrison |
| 6,073,997 | A | 6/2000 | Koh |
| 6,375,257 | B1 | 4/2002 | Wooding |
| 6,511,131 | B1 | 1/2003 | Harnois |
| 7,017,988 | B2 | 3/2006 | Tornero |
| 7,125,074 | B2 | 10/2006 | Real |
| 7,726,732 | B1 | 6/2010 | Keating |
| 7,862,111 | B2 | 1/2011 | Steenson |
| 8,079,553 | B1 | 12/2011 | Martin |
| 8,109,566 | B2 | 2/2012 | Koh |
| 8,347,791 | B1 | 1/2013 | Gray |
| 8,746,788 | B2 | 6/2014 | Su |
| 8,794,698 | B2 | 8/2014 | Halsey |
| 8,899,672 | B2 | 12/2014 | Li |
| 8,979,190 | B2 | 3/2015 | Madrigal |
| 8,985,684 | B2 | 3/2015 | Zheng |
| 10,244,870 | B1 | 4/2019 | Bobst |
| 10,653,242 | B2 | 5/2020 | Ortiz |
| 10,986,927 | B2 | 4/2021 | Fiden |
| 11,330,908 | B1 * | 5/2022 | Strosin .................... A63F 13/24 |
| 11,805,916 | B2 * | 11/2023 | Strosin .................... A63F 13/24 |
| 2001/0026087 | A1 | 10/2001 | Tomita |
| 2005/0140187 | A1 | 6/2005 | Kordecki |
| 2006/0192415 | A1 | 8/2006 | Steenson |
| 2007/0164589 | A1 | 7/2007 | Rossini |
| 2008/0073946 | A1 | 3/2008 | Maione |
| 2009/0206641 | A1 | 8/2009 | Brown, Jr. |
| 2009/0218860 | A1 | 9/2009 | Hernandez |
| 2012/0223555 | A1 | 9/2012 | Brown, Jr. |
| 2013/0059667 | A1 | 3/2013 | Nadal Berlinches |
| 2022/0400868 | A1 * | 12/2022 | Nelson .................. A47C 7/725 |

FOREIGN PATENT DOCUMENTS

| | | |
|---|---|---|
| JP | S585856 | 1/1983 |
| KR | 20020090824 | 12/2002 |
| KR | 20090001844 | 2/2009 |
| KR | 20110050165 | 5/2011 |

OTHER PUBLICATIONS

Chinese Office Action for App. No. CN 202210955575.3, Jan. 22, 2024.

* cited by examiner

Figure 3
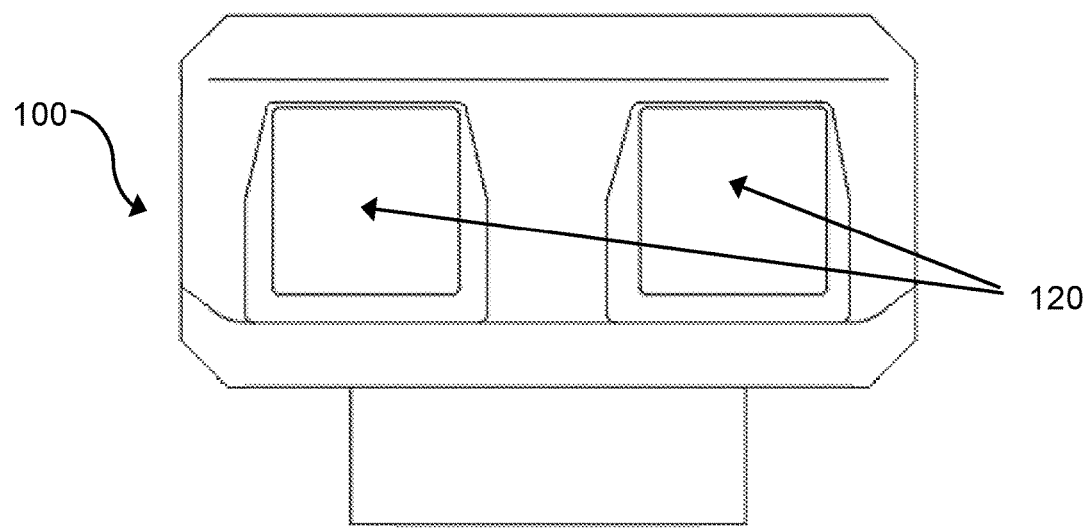
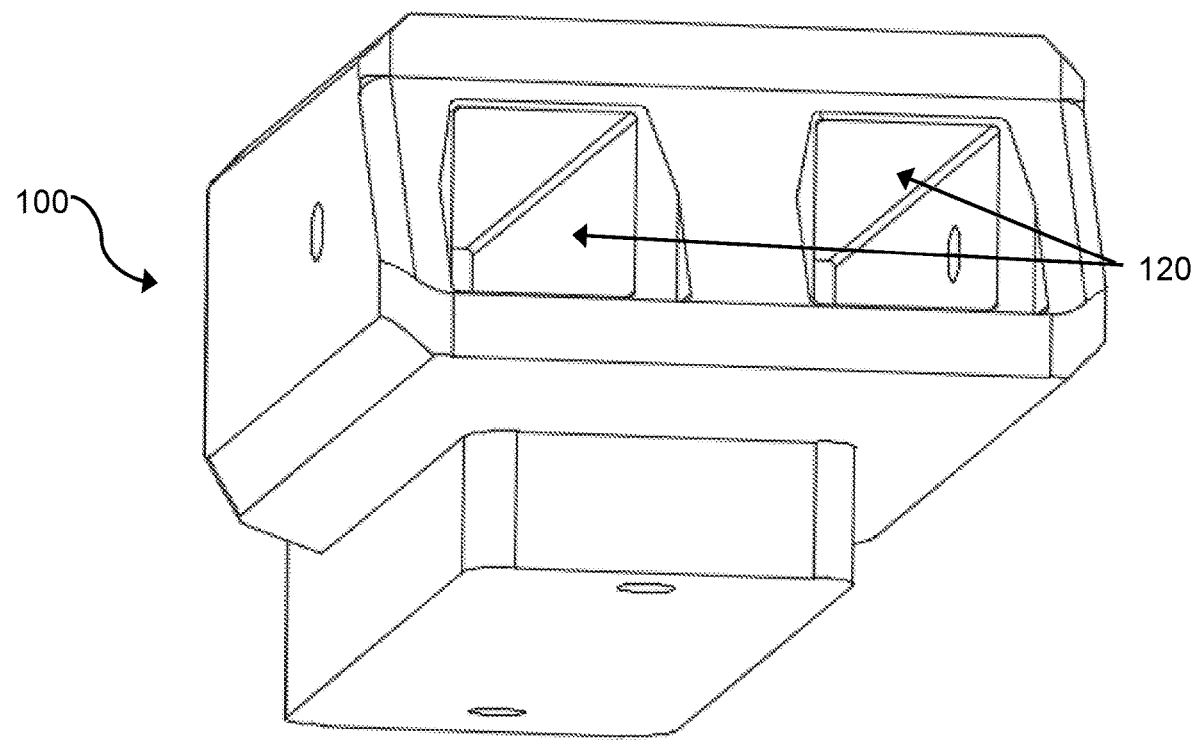
Figure 4

Figure 8
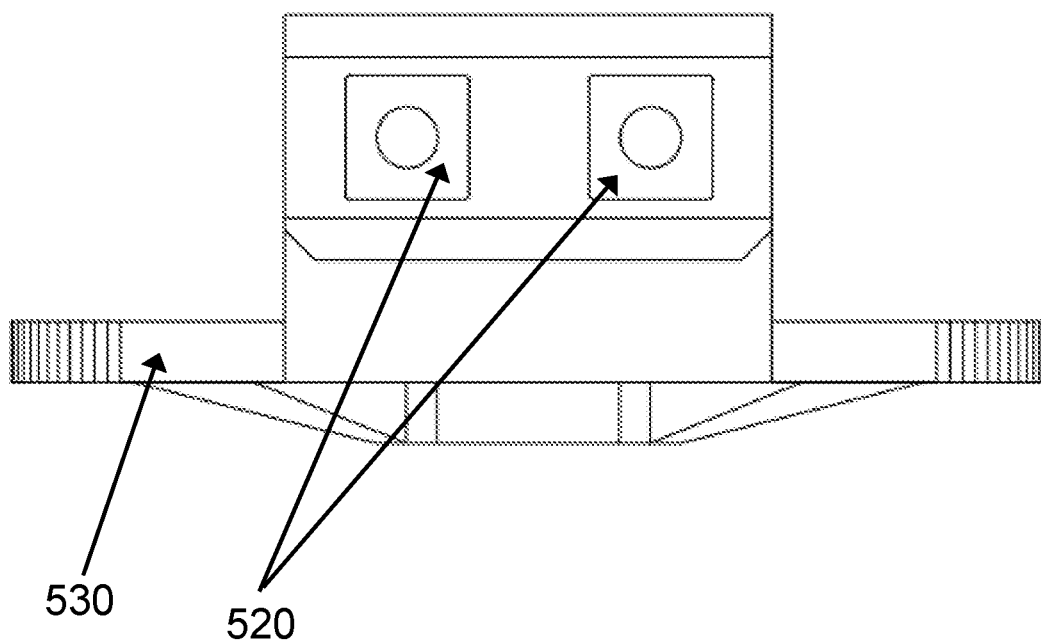
530   520
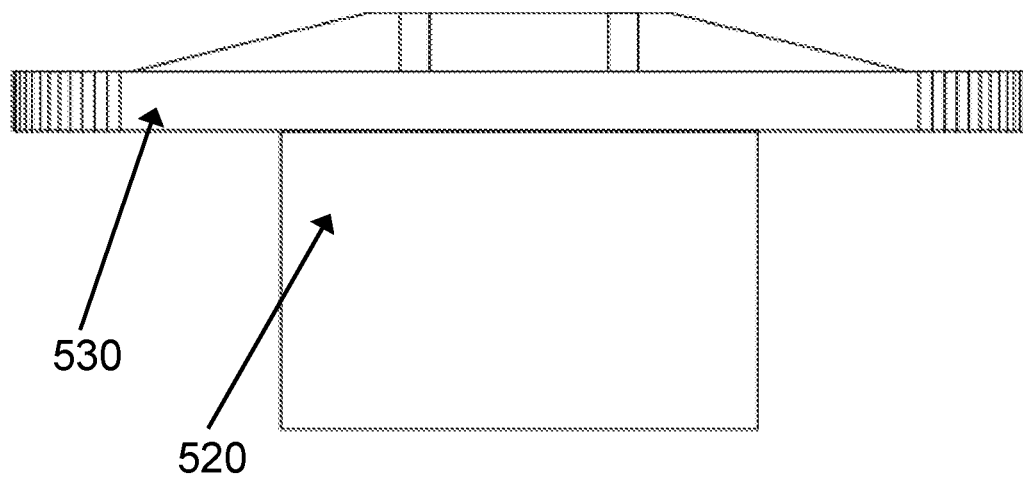
530
520
Figure 9

1300

1400

1500

1600

REMOVABLE MODULAR ATTACHMENT SYSTEM FOR ACCESSORIES

I. CROSS-REFERENCE TO RELATED APPLICATIONS

This application is a continuation of U.S. patent application Ser. No. 17/745,833, entitled "Removable Modular Attachment System For Accessories," and filed May 16, 2022, now U.S. Pat. No. 11,805,916 B2, which is a continuation of U.S. patent application Ser. No. 17/545,957, now U.S. Pat. No. 11,330,908, entitled "Removable Modular Attachment System For Accessories," and filed Dec. 8, 2021, which claims priority to U.S. Patent Application No. 63/122,958, entitled "Removable Modular Attachment System For Accessories," and filed Dec. 9, 2020. The entirety of the foregoing patent applications is incorporated by reference herein to the extent consistent with the present disclosure.

II. TECHNICAL FIELD

The disclosure generally relates to modular attachment systems and methods for quick-connect and quick disconnect of accessories and peripherals to office, computer, and gaming chairs, desks, tables or other furniture or other fixed points.

III. BACKGROUND OF THE INVENTION

Current devices or systems to attach devices or peripherals to office, computer or gaming furniture typically require a permanent installation of the accessories or peripherals to the furniture. Such systems typically require a substantial disassembly of the furniture and lengthy installation of a large number of components. If removal of accessories or peripherals is desired, a similar complex disassembly of installed components would be required and necessitating the use of various tools. A dedicated gaming chair with all of the accessories and peripherals required to be permanently attached may be used, but at considerable expense that is beyond the resources of many consumers and without the ability to remove or change accessories and peripherals to fulfill different applications.

In today's household and office environments there are many accessories and peripherals that connect electrically and/or digitally to electronic devices. Typically, those accessories and peripherals are physically placed on the arm rest of a chair or on a desk, table, or other type of furnishing near the electronic device. This placement does not physically secure the accessories or peripherals to the surface of the chair, desk, or table and the accessories or peripherals can be easily moved, intentionally or unintentionally. A need exists to quickly attach peripherals and accessories to and remove them from furniture and to retain them in a fixed location for convenient use by an operator.

IV. BRIEF DESCRIPTION OF THE DRAWINGS

FIG. 3 depicts a front view of a modular receiver in accordance with certain embodiments.

FIG. 4 depicts a perspective view of a modular receiver in accordance with certain embodiments.

FIG. 8 depicts a back view of a modular peripheral adapter in accordance with certain embodiments.

FIG. 9 depicts a front view of a modular peripheral adapter in accordance with certain embodiments.

V. DETAILED DESCRIPTION

Figure 1:
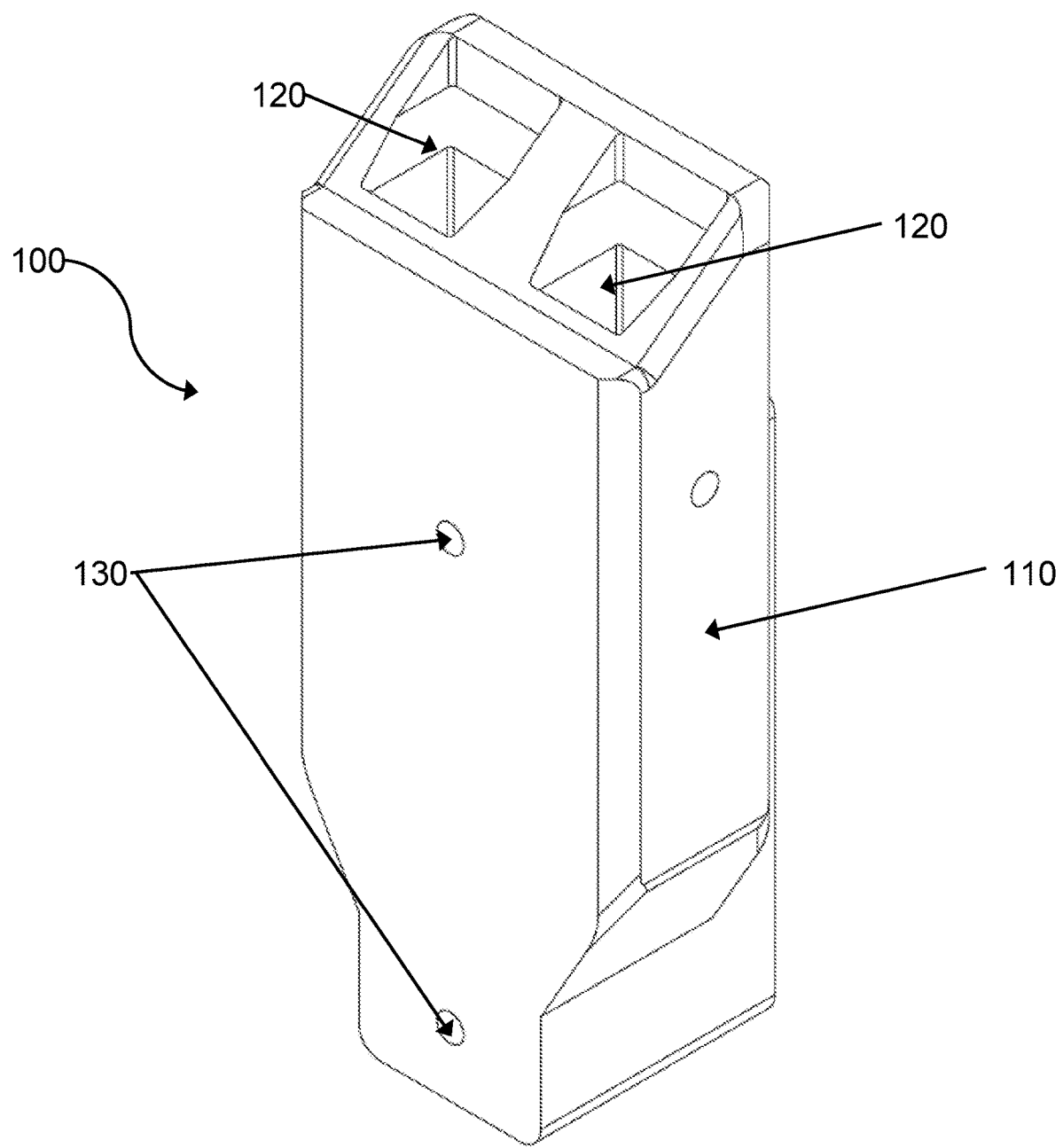
FIG. 1 depicts a perspective view of a modular receiver in accordance with certain embodiments.
Figure 2:
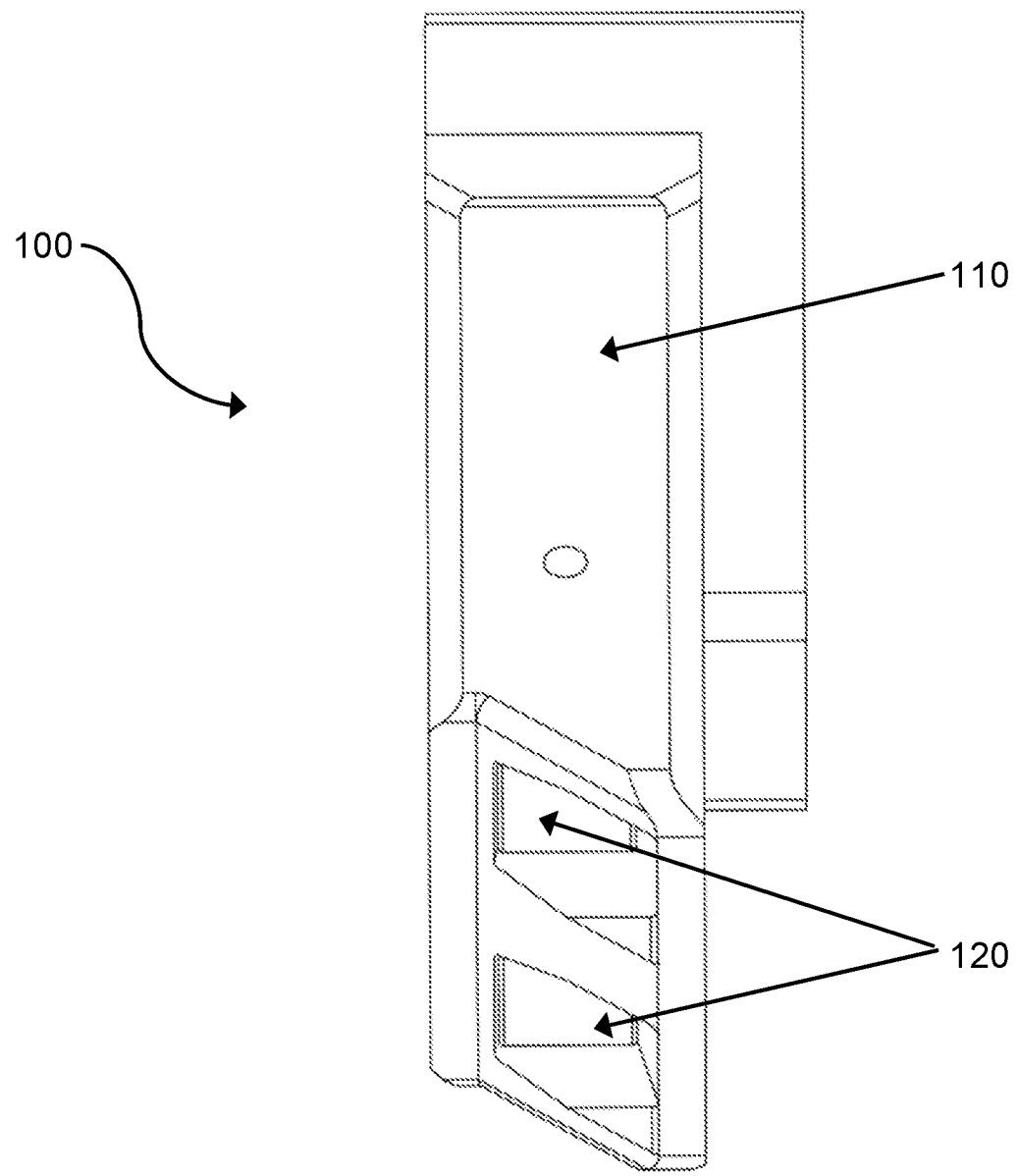
FIG. 2 depicts a side view of a modular receiver in accordance with certain embodiments.
Figure 5:
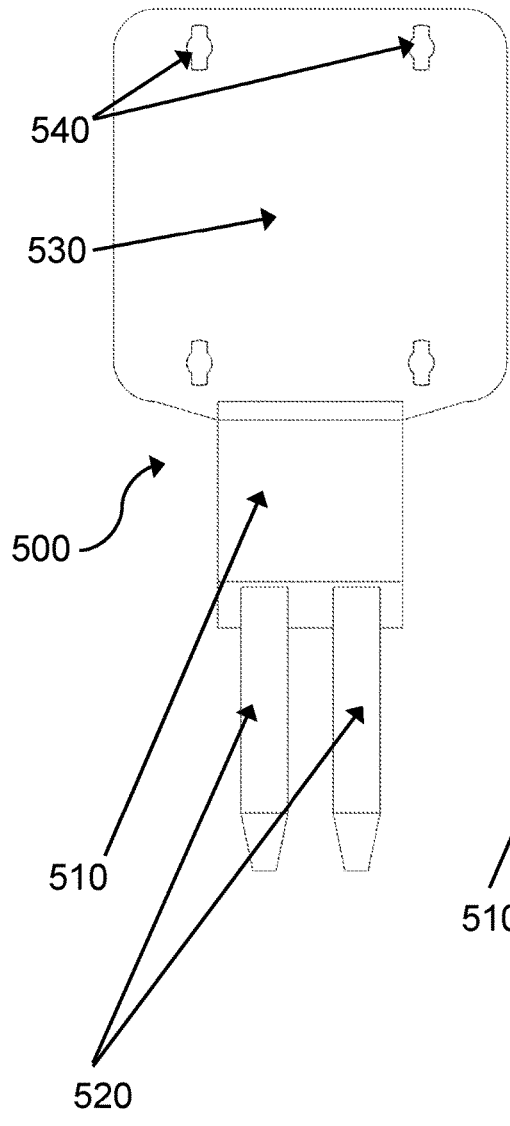
FIG. 5 depicts a top view of a modular peripheral adapter in accordance with certain embodiments.
Figure 6:
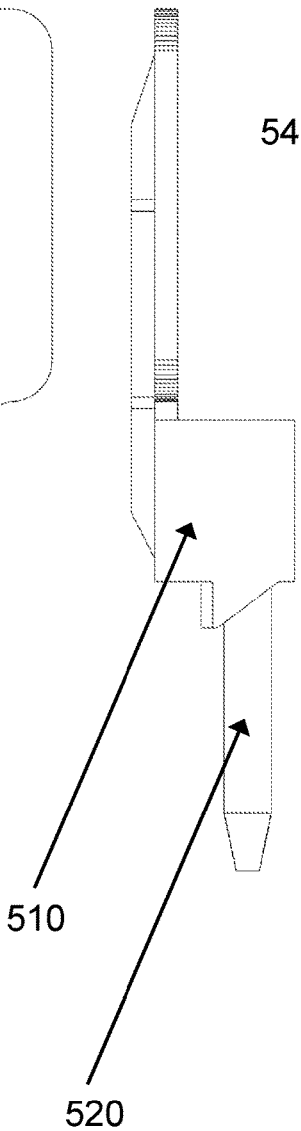
FIG. 6 depicts a side view of a modular peripheral adapter in accordance with certain embodiments.
Figure 7:
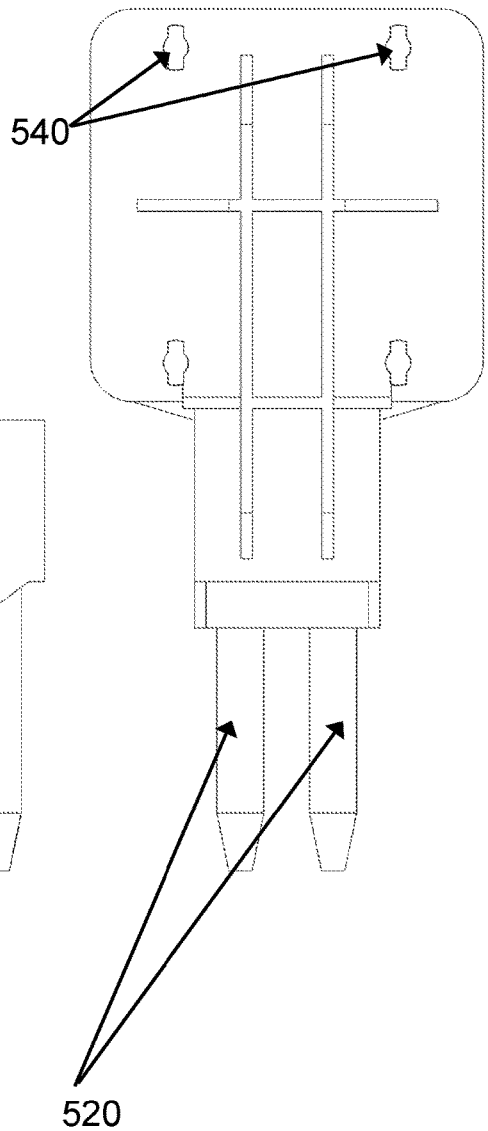
FIG. 7 depicts a bottom view of a modular peripheral adapter in accordance with certain embodiments.

In certain embodiments, a removable modular attachment system is provided that may enable non-permanent attachment of accessories and peripherals to a fixed location. In certain embodiments, peripherals may include without limitation a joystick, a mouse, a keyboard, a virtual reality controller, a desk, a game controller such as a steering wheel, a flight yoke, a throttle, other game controllers known to one of skill in the art, or other computer input devices known to one of skill in the art. In certain embodiments, accessories may include without limitation a cable management adapter, a universal serial bus hub, a mouse pad, a virtual reality controller holder, a cup holder, a headset holder, a tablet holder, a phone holder, a game controller holder, a remote holder, a light, a keyboard, a rumble pack or other tactile feedback device, a webcam holder, a paper holder, a snack holder, and a virtual reality headset holder.

In certain embodiments, the accessories and peripherals may be attached by means of a removable modular attachment system to a chair, desk, table, other piece of furniture or fixed point such as a wall or ceiling to prevent those accessories/peripherals from being unintentionally moved during their use, thereby allowing for dynamic operation of the accessories and peripherals, for example and without limitation through the use of a gaming joystick or steering wheel. The removable modular attachment system for accessories may be placed within the arm rest of the office, computer or gaming chair and may allow for quick-connect and disconnect of multiple types of accessories and peripherals.

In certain embodiments, the removable modular attachment system may convert an ordinary office, computer or gaming chair into a simulator chair by securely but removably connecting one or more controllers, including but not limited to joysticks, throttles, steering wheels, or other input devices to the chair and disposing them at the fingertips of the operator. In certain embodiments, the removable modular attachment system may convert an ordinary office, computer or gaming chair into a professional grade control station by securely but removably connecting one or more input devices, including but not limited to one or more keyboards, trackball devices, computer aided drafting input devices or other input devices and disposing them at the fingertips of the user.

The removable modular attachment system may utilize existing components of a chair, desk, table, or other piece of furniture and after the initial installation, its quick-connect/disconnect design may allow for fast and simple attachment to and removal from a chair, desk, table, or other piece of furniture of accessories and peripherals without any component disassembly or use of any tools, allowing the user to use the chair, desk, table, or other piece of furniture for the original intended purpose. In certain embodiments, the removable modular attachment system may allow for rapidly changing the configuration of accessories or peripherals connected to the chair, desk, table, or other piece of furniture. The removable modular attachment system may be particularly useful in the Virtual Reality (VR) environment. As VR headsets totally obscure the outside vision of the gamer/operator, the ability to have the accessories and peripherals located in a fixed location, such as at the end of an arm rest, may allow for a fast location of the accessories/peripherals without use of sight. Additionally, the removable modular attachment system may allow the gamer/operator to rotate in the chair while maintaining positive control of the accessories and peripherals positioned by the removable modular attachment system.

In certain embodiments, the removable modular attachment system can be made of plastics, metals, natural manufacturing materials, or of a combination of any or all.

In certain embodiments, a method is disclosed of quickly and toollessly connecting one or more peripherals to a piece of furniture comprising a first modular receiver comprising a first one or more quick-connect receptacles. The method may comprise: providing a first modular peripheral adapter, comprising: a first one or more quick connectors for toollessly engaging the first one or more quick-connect receptacles to toollessly connect the first modular peripheral adapter to the piece of furniture: and a first platform for attaching a peripheral: and toollessly connecting the first modular peripheral adapter to the first modular receiver by removably connecting the first one or more quick connectors to the first one or more quick-connect receptacles without the use of tools. The first modular receiver may be attached below a part of the piece of furniture. The step of toollessly connecting the first modular peripheral adapter may further comprise: attaching a peripheral to the first platform of the first modular peripheral adapter to form a first adapted peripheral assembly: and toollessly connecting the first adapted peripheral assembly to the piece of furniture by removably connecting the first one or more quick connectors to the first one or more quick-connect receptacles without the use of tools. The piece of furniture may comprise a chair that may comprise a first arm rest and the first one or more quick-connect receptacles may be disposed adjacent the first arm rest so that when the first modular peripheral adapter is attached to the first modular receiver, a first peripheral attached to the first platform may be disposed forward of the first arm rest. The first one or more quick connect receptacles may be disposed below the first arm rest. The chair may further comprise a second arm rest, the second modular receiver comprising one or more quick-connect receptacles disposed adjacent the second arm rest: wherein the first modular peripheral adapter may further comprise a second one or more quick connectors spaced apart from the first or more quick connectors. The second modular receiver may comprise one or more quick connect receptacles disposed below the second arm rest. The method may further comprise toollessly connecting the first modular peripheral adapter to the second modular receiver by removably connecting the second one or more quick connectors to the second one or more quick-connect receptacles without the use of tools to removably connect the first modular peripheral adapter to the second modular receiver such that the first platform of the first modular peripheral adapter may be disposed across a gap between the first arm rest and the second arm rest. The chair may further comprise a second arm rest and a second modular receiver comprising a second one or more quick-connect receptacles disposed adjacent the second arm rest. The second one or more quick-connect receptacles may be disposed below the second arm rest. The method may further comprise: providing a second modular peripheral adapter, the second modular peripheral adapter comprising: a second one or more quick connectors for engaging the second one or more quick-connect receptacles in the second modular receiver to toollessly connect the second modular peripheral adapter to the second modular receiver; and a second platform for attaching a second one or more peripherals; and toollessly connecting the second modular peripheral adapter to the second modular receiver by removably connecting the second one or more quick connectors to the second one or more quick-connect receptacles without the use of tools, whereby the second platform is disposed forward of the second arm rest. The first modular peripheral adapter may further comprise a desk surface rotatably attached to the first platform. The method may further comprise: selectively rotating the desk surface between a first position wherein the desk surface is disposed across the gap between the first arm rest and the second arm rest to provide a work surface and a second position wherein the desk surface does not entirely block the gap between the first arm rest and the second arm rest to permit a user to access a seating surface of the chair without removing the modular peripheral adapter from the chair.

In certain embodiments, a removable modular attachment system is disclosed for quickly and toollessly connecting one or more peripherals to a piece of furniture. The system may comprise: a first modular receiver comprising a first one or more quick-connect receptacles for accommodating a corresponding first one or more quick connectors of a first modular peripheral adapter without the use of tools. The first modular receiver may be attached below a part of the piece of furniture. The first modular receiver may be configured so that when the first modular peripheral adapter is toollessly connected to the first modular receiver, a first platform of the first modular peripheral adapter may be disposed so that one or more peripherals attached to the first platform may be positioned for use by a user of the piece of furniture. The piece of furniture may be one of a chair, a desk or a table and the first modular receiver may be configured to be attached to an arm rest of the chair, a seat of the chair or a surface of the desk or the table so that when the first modular peripheral adapter is toollessly connected to the first modular receiver, a first platform of the first modular peripheral adapter may be disposed so that one or more peripherals attached to the first platform may be positioned for use by a user of the chair, the desk or the table. The first modular receiver may be removably attached to the piece of furniture or built into the piece of furniture. The first one or more quick-connect receptacles may face forward to accept the first one or more quick connectors of the first modular peripheral adapter. The first one or more quick-connect receptacles may comprise a plurality of quick-connect receptacles and the corresponding first one or more quick connectors may comprise a corresponding plurality of quick connectors.

In certain embodiments, a modular peripheral adapter is disclosed for use with a removable modular attachment system for quickly and toollessly connecting one or more peripherals to a first modular receiver comprising a first one or more quick-connect receptacles. The modular peripheral adapter may comprise: a first one or more quick connectors for engaging the first one or more quick-connect receptacles without the use of tools to toollessly connect the first modular peripheral adapter to the first modular receiver: and a first platform for attaching a peripheral. The peripheral may comprise one of a joystick, a mouse, a keyboard, a virtual reality controller, a desk, a game controller, a steering wheel, a flight yoke, a throttle, or a computer input device. The piece of furniture may be one of a chair, a desk or a table and the first modular receiver may be configured to be attached to an arm rest of the chair, a seat of the chair or a surface of the desk or the table so that when the first modular peripheral adapter is toollessly connected to the first modular receiver, a first platform of the first modular peripheral adapter may be disposed so that one or more peripherals attached to the first platform are positioned for use by a user of the chair, the desk or the table. The modular peripheral adapter may further comprise a second one or more quick connectors spaced apart from the first one or more quick connectors for toollessly connecting the first modular peripheral adapter to a second modular receiver attached to the piece of furniture. The second modular receiver may comprise a second one or more quick-connect receptacles, by removably connecting the second one or more quick connectors to the second one or more quick-connect receptacles without the use of tools to toollessly connect the first modular peripheral adapter to the second modular receiver. The piece of furniture may be a chair, the first one or more quick-connect receptacles may be disposed adjacent a first arm rest of the chair and the second one or more quick-connect receptacles may be disposed adjacent a second arm rest such that when the first modular peripheral adapter is attached to the first modular receiver and the second modular receiver, the first platform of the first modular peripheral adapter may be disposed across a gap between the first arm rest and the second arm rest. The first platform may be rotatably attached to the first modular peripheral adapter to allow rotation of the first platform between a first position wherein the first platform of the first modular peripheral adapter may be disposed across the gap between the first arm rest and the second arm rest and a second position wherein the first platform of the first modular peripheral adapter may not entirely block a gap between the first arm rest and the second arm rest to permit a user to access a seating surface of the chair without removing the first modular peripheral adapter from the chair. The piece of furniture may be a chair, the first one or more quick-connect receptacles may be disposed adjacent a first arm rest of the chair and the first platform may be a desk surface configured to be selectively extended across a gap between the first arm rest and the second arm rest. The desk surface may be movably attached to the first modular peripheral adapter to allow rotation or sliding of the desk surface between a first position wherein the desk surface may be disposed across the gap between the first arm rest and the second arm rest and a second position wherein the desk surface may not entirely block the gap between the first arm rest and the second arm rest to permit a user to access a seating surface of the chair without removing the first modular peripheral adapter from the chair. The desk surface may be configured to engage a second modular peripheral adapter toollessly connected to a second modular receiver disposed adjacent to a second arm rest. The modular peripheral adapter may further comprise one or more of a cable management adapter, a universal serial bus hub, a mouse pad, a virtual reality controller holder, a cup holder, a headset holder, a tablet holder, a phone holder, a game controller holder, a remote holder, a light, a keyboard, a rumble pack or other tactile feedback device, a webcam holder, a paper holder, a snack holder, and a virtual reality headset holder. The first one or more quick connectors may comprise a plurality of quick connectors and the first one or more quick-connect receptacles may comprise a corresponding plurality of quick-connect receptacles.

In certain embodiments, a method is disclosed of removably attaching one or more peripherals to a piece of furniture comprising a first modular receiver comprising a first one or more quick-connect receptacles, the method comprising: providing a first modular peripheral adapter, comprising: a first one or more quick connectors for engaging the first one or more quick-connect receptacles to removably attach the first modular peripheral adapter to the piece of furniture: and a first platform for attaching a peripheral: and removably attaching the first modular peripheral adapter to the first modular receiver by removably connecting the first one or more quick connectors to the first one or more quick-connect receptacles.

In certain embodiments, the one or more quick-connect receptacles may comprise one or more female quick-connect fittings and the one or more quick connectors may comprise one or more male quick-connect fittings. In certain embodiments, the one or more quick-connect receptacles may comprise one or more male quick-connect fittings and the one or more quick connectors may comprise one or more female quick-connect fittings. In certain embodiments, the one or more quick connectors may comprise one or more elongate members and the one or more quick-connect receptacles may comprise one or more openings for receiving the one or more elongate members and the step of removably attaching the first modular peripheral adapter to the first modular receiver may comprise sliding the first one or more quick connectors into the first one or more quick-connect receptacles. In certain embodiments, the one or more quick connectors may have a first cross section that substantially matches a second cross section of the one or more quick-connect receptacles so that the one or more quick connectors may frictionally engage the one or more quick-connect receptacles to removably connect a modular peripheral adapter to a modular receiver. In certain embodiments, one or more quick connectors may comprise a first slide portion for engaging a second slide portion of one or more quick-connect receptacles to allow the one or more quick connectors to slidably engage the one or more quick-connect receptacles to removably attach a modular peripheral adapter to a modular receiver. In certain embodiments, the one or more quick-connect receptacles may comprise a first one or more magnetic elements and the one or more quick connectors may comprise a second one or more magnetic elements to removably connect the one or more quick connectors to the one or more quick-connect receptacles to removably attach a modular peripheral adapter to a modular receiver. One of skill in the art will recognize that other quick connect combinations may be used for the quick connect receptacles and quick connect connectors without departing from the scope of the appended claims.

The step of removably attaching the first modular peripheral adapter may further comprise: attaching a peripheral to the first platform of the first modular peripheral adapter to form a first adapted peripheral assembly: and removably attaching the first adapted peripheral assembly to the piece of furniture by removably connecting the first one or more quick connectors to the first one or more quick-connect receptacles. The piece of furniture may comprise a chair comprising a first arm rest and wherein the first one or more quick-connect receptacles may be disposed adjacent the first arm rest so that when the first modular peripheral adapter is attached to the first modular receiver, a first peripheral attached to the first platform may be disposed forward of the first arm rest. The chair may further comprise a second arm rest, the second modular receiver comprising one or more quick-connect receptacles disposed adjacent the second arm rest; the first modular peripheral adapter may further comprise a second one or more quick connectors spaced apart from the first or more quick connectors; and the method may further comprise removably attaching the first modular peripheral adapter to the second modular receiver by removably connecting the second one or more quick connectors to the second one or more quick-connect receptacles to removably attach the first modular peripheral adapter to the second modular receiver such that the first platform of the first modular peripheral adapter may be disposed across a gap between the first arm rest and the second arm rest.

The chair may further comprise a second arm rest and a second modular receiver comprising a second one or more quick-connect receptacles disposed adjacent the second arm rest: and the method may further comprise: providing a second modular peripheral adapter, the second modular peripheral adapter comprising: a second one or more quick connectors for engaging the second one or more quick-connect receptacles in the second modular receiver to removably attach the second modular peripheral adapter to the second modular receiver: and a second platform for attaching a second one or more peripherals: and removably attaching the second modular peripheral adapter to the second modular receiver by removably connecting the second one or more quick connectors to the second one or more quick-connect receptacles, whereby the second platform may be disposed forward of the second arm rest.

The first modular peripheral adapter may further comprise a desk surface rotatably attached to the first platform: and the method may further comprise: selectively rotating the desk surface between a first position wherein the desk surface may be disposed across the gap between the first arm rest and the second arm rest to provide a work surface and a second position wherein the desk surface may not entirely block the gap between the first arm rest and the second arm rest to permit a user to access a seating surface of the chair without removing the modular peripheral adapter from the chair.

In certain embodiments, a removable modular attachment system is disclosed for removably attaching one or more peripherals to a piece of furniture, the system comprising: a first modular receiver comprising a first one or more quick-connect receptacles for accommodating a corresponding first one or more quick connectors of a first modular peripheral adapter: wherein the first modular receiver may be configured so that when the first modular peripheral adapter is removably attached to the first modular receiver, a first platform of the first modular peripheral adapter may be disposed so that one or more peripherals attached to the first platform may be positioned for use by a user of the piece of furniture. The piece of furniture may be one of a chair, a desk or a table and the first modular receiver may be configured to be attached to an arm rest of the chair, a seat of the chair, the back of a chair or a surface of the desk or the table so that when the first modular peripheral adapter is removably attached to the first modular receiver, a first platform of the first modular peripheral adapter may be disposed so that one or more peripherals attached to the first platform may be positioned for use by a user of the chair, the desk or the table. The first modular receiver may be removably attached to the piece of furniture or built into the piece of furniture.

In certain embodiments, a modular peripheral adapter is disclosed for use with a removable modular attachment system for removably attaching one or more peripherals to a first modular receiver comprising a first one or more quick-connect receptacles, the modular peripheral adapter comprising: a first one or more quick connectors for engaging the first one or more quick-connect receptacles to removably attach the first modular peripheral adapter to the first modular receiver; and a first platform for attaching a peripheral. The peripheral may comprise one of a joystick, a mouse, a keyboard, a virtual reality controller, a desk, a game controller such as a steering wheel, a flight yoke, a throttle, a game controller, or a computer input device. The piece of furniture may be one of a chair, a desk or a table and the first modular receiver may be configured to be attached to an arm rest of the chair, a seat of the chair or a surface of the desk or the table so that when the first modular peripheral adapter is removably attached to the first modular receiver, a first platform of the first modular peripheral adapter may be disposed so that one or more peripherals attached to the first platform may be positioned for use by a user of the chair, the desk or the table.

The modular peripheral adapter may further comprise a second one or more quick connectors spaced apart from the first one or more quick connectors for removably attaching the first modular peripheral adapter to a second modular receiver attached to the piece of furniture, the second modular receiver comprising a second one or more quick-connect receptacles, by removably connecting the second one or more quick connectors to the second one or more quick-connect receptacles to removably attach the first modular peripheral adapter to the second modular receiver. The piece of furniture may be a chair, the first one or more quick-connect receptacles may be disposed adjacent a first arm rest of the chair and the second one or more quick-connect receptacles may be disposed adjacent a second arm rest such that when the first modular peripheral adapter is attached to the first modular receiver and the second modular receiver, the first platform of the first modular peripheral adapter may be disposed across a gap between the first arm rest and the second arm rest.

The first platform may be rotatably attached to the first modular peripheral adapter to allow rotation of the first platform between a first position wherein the first platform of the first modular peripheral adapter may be disposed across the gap between the first arm rest and the second arm rest and a second position wherein the first platform of the first modular peripheral adapter may not entirely block a gap between the first arm rest and the second arm rest to permit a user to access a seating surface of the chair without removing the first modular peripheral adapter from the chair. The piece of furniture may be a chair, the first one or more quick-connect receptacles may be disposed adjacent a first arm rest of the chair and the first platform may be a desk surface configured to be selectively extended across a gap between the first arm rest and the second arm rest.

The desk surface may be movably attached to the first modular peripheral adapter to allow rotation or sliding of the desk surface between a first position wherein the desk surface may be disposed across the gap between the first arm rest and the second arm rest and a second position wherein the desk surface may not entirely block the gap between the first arm rest and the second arm rest to permit a user to access a seating surface of the chair without removing the first modular peripheral adapter from the chair. The desk surface may be configured to engage a second modular peripheral adapter removably attached to a second modular receiver disposed adjacent to a second arm rest.

The desk surface may comprise a first one or more magnets, the second modular peripheral adapter may comprise a second one or more magnets and the desk surface may be configured to engage the second modular peripheral adapter by positioning the first one or more magnets to magnetically engage the second one or more magnets when the desk surface is in the first position. The modular peripheral adapter may further comprise one or more of a cable management adapter, a universal serial bus hub, a mouse pad, a virtual reality controller holder, a cup holder, a headset holder, a tablet holder, a phone holder, a game controller holder, a remote holder, a light, a keyboard a rumble pack or other tactile feedback device, a webcam holder, a paper holder, a snack holder, and a virtual reality headset holder.

In certain embodiments, the dimensions of the removable modular attachment system for accessories can be adjusted to fit the accessories and peripherals and/or the chair to which the system is attached.

In certain embodiments, the removable modular attachment system may include one or more modular receivers 100 as shown in FIGS. 1-4. The one or more modular receivers 100 may include a housing 110 that defines one or more quick-connect receptacles 120. The one or more quick-connect receptacles 120 may each define a longitudinal axis. In certain embodiments, the housing 110 of modular receiver 100 may include a plurality of quick-connect receptacles 120 and the longitudinal axes of the plurality of quick-connect receptacles 120 may be substantially parallel to each other. In certain embodiments, may include one or more receiver mounting holes 130 to permit attachment of the modular receiver to a chair, desk, table, or other piece of furniture or fixed point such as a wall or ceiling. In certain embodiments, receiver mounting holes 130 may be located in predetermined locations on the housing and may be spaced apart to correspond to standard spacings for existing components of a chair, desk, table, or other piece of furniture.

Figures 10, 11:
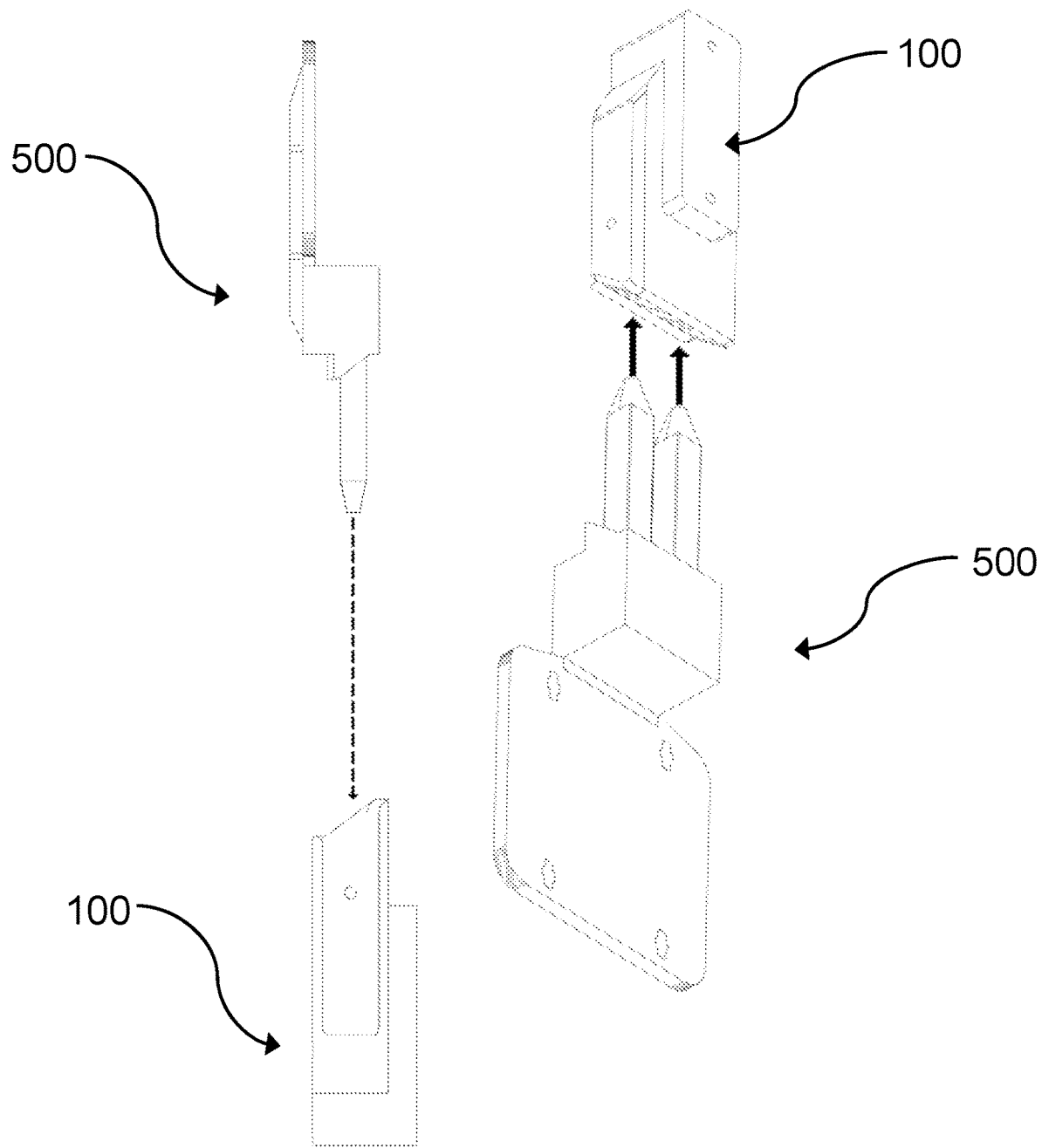
FIG. 10 depicts a side view of attaching a modular peripheral adapter to a modular receiver in accordance with certain embodiments.
FIG. 11 depicts a perspective view of attaching a modular peripheral adapter to a modular receiver in accordance with certain embodiments.
Figure 12:
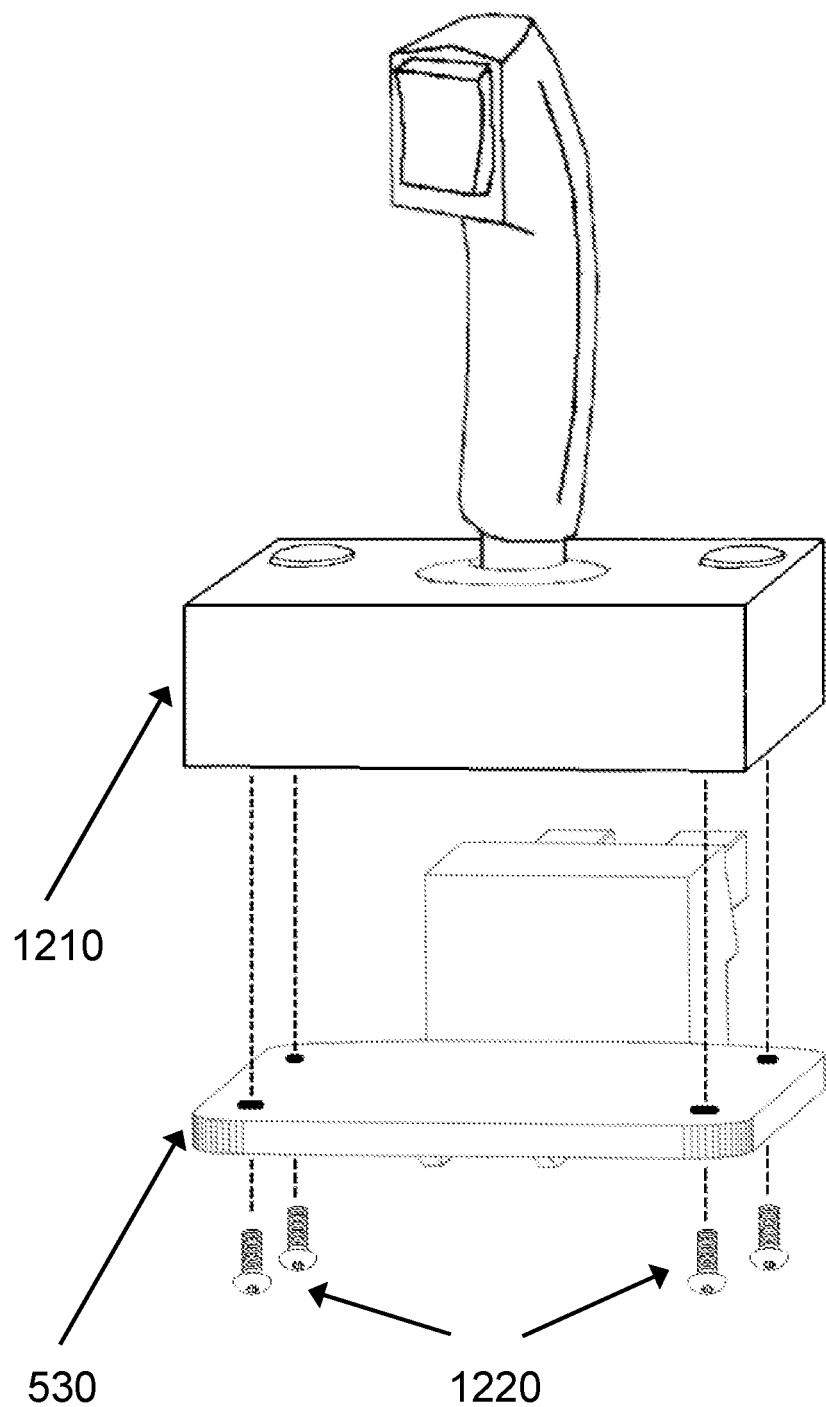
FIG. 12 depicts assembly of an adapted peripheral assembly by attaching a peripheral to a modular peripheral adapter in accordance with certain embodiments.
Figure 19:
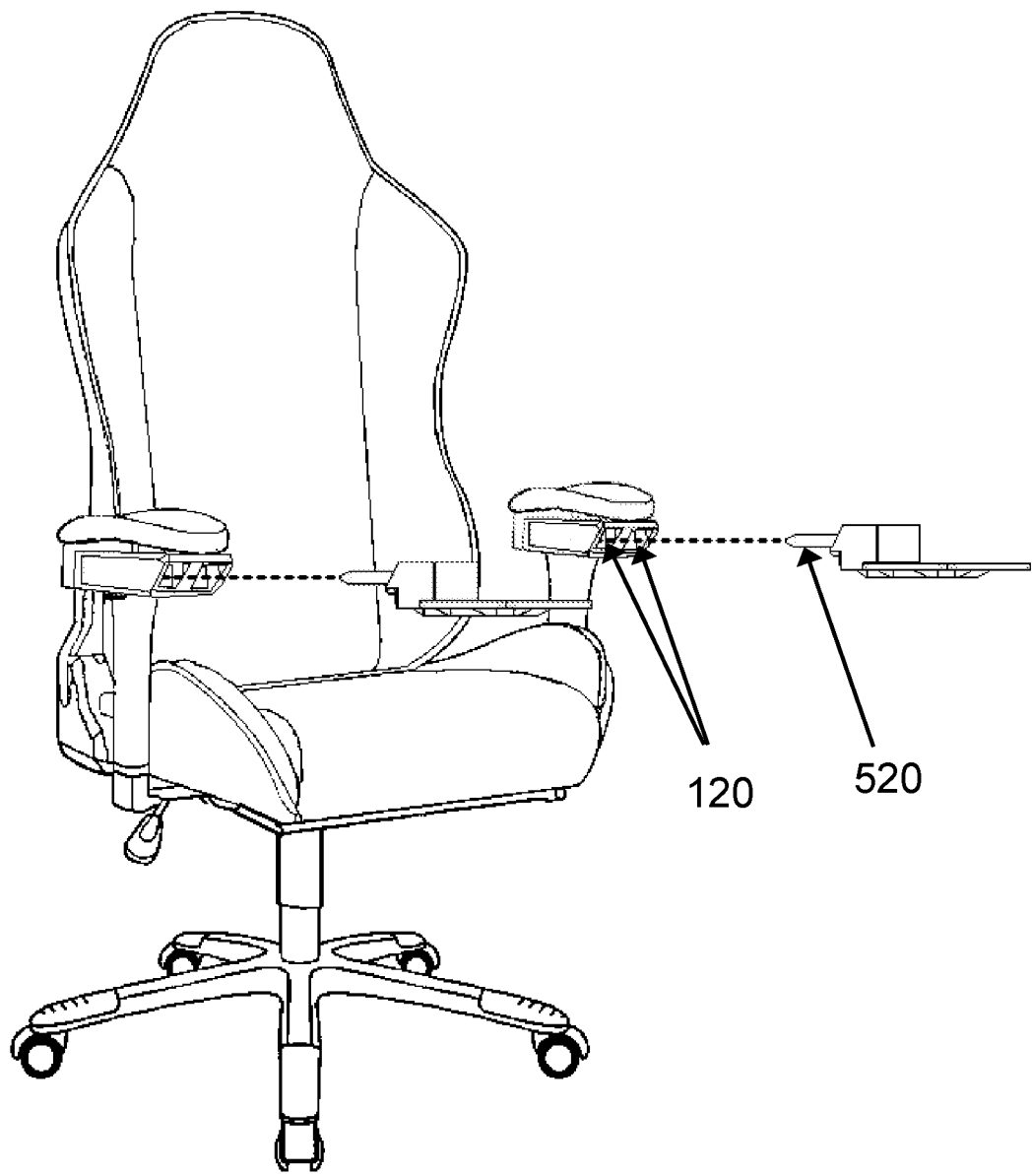
FIG. 19 depicts a perspective view of attaching two modular peripheral adapters to the two modular receivers attached to the chair of FIG. 18 in accordance with certain embodiments.

In certain embodiments, a modular peripheral adapter 500 as shown in FIGS. 5-9 may provide an adapter for attaching accessories or peripherals and permitting quick-connection and disconnection of those accessories or peripherals to a modular housing 100. Modular peripheral adapter 500 may include a housing 510 with a first side and a second side opposite the first side, and one or more quick connectors 520 extending from the first side of housing 510. In certain embodiments as shown in FIGS. 10-11 and 19, one or more quick connectors 520 may be adapted to slidably engage a corresponding one or more quick-connect receptacles 120 of modular receiver 100 to selectively connect and disconnect the modular peripheral adapter 500 and thus any attached accessories or peripherals to or from the modular receiver 100. As shown in FIGS. 10-11, one or more peripheral adapters 500 may be quick-connected to or disconnected from one or more modular housings 100. The modular peripheral adapter also may include a platform 530 extending from the second side of the housing, and adapted for attachment of one or more peripherals. Platform 530 may include one or more peripheral mounting holes 540 to permit attachment of one or more peripherals. In certain embodiments, peripheral mounting holes 540 may be located in predetermined locations on the platform and may be spaced apart to correspond to standard spacings for existing peripherals. In certain embodiments, peripheral mounting holes 540 may include holes for multiple different peripherals to allow a single modular peripheral adapter to be attached to multiple different peripherals without needing to modify the modular peripheral adapter, in effect creating a universal modular peripheral adapter. In certain embodiments, platform 530 may be adjustable to accommodate various body types of the gamer/operator.

Figure 13:
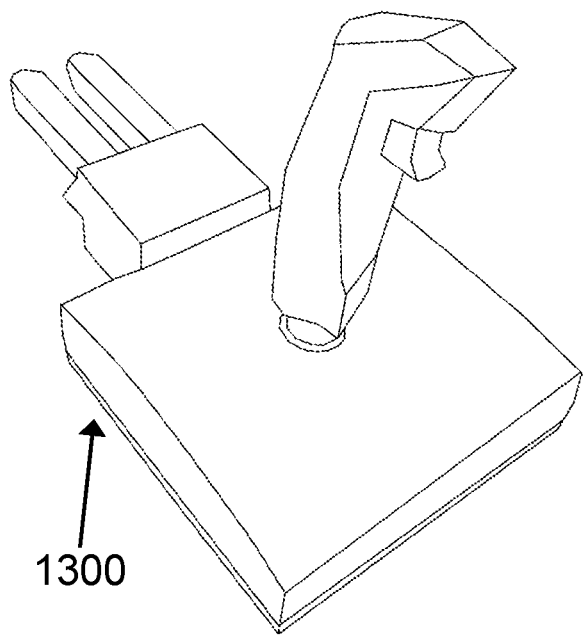
FIG. 13 depicts a perspective view of an adapted peripheral assembly including a joystick in accordance with certain embodiments.
Figure 14:
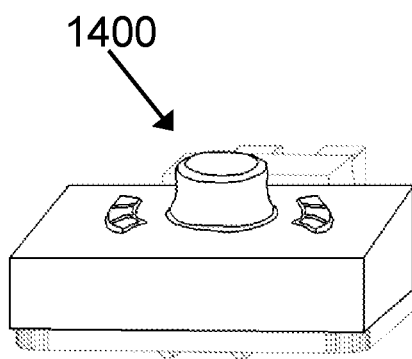
FIG. 14 depicts a front view of an adapted peripheral assembly including a Computer Aided Design (CAD) controller in accordance with certain embodiments.
Figure 15:
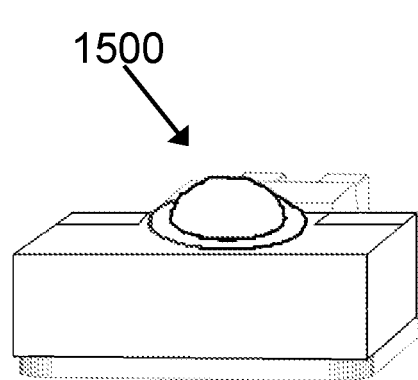
FIG. 15 depicts a front view of an adapted peripheral assembly including a trackball in accordance with certain embodiments.
Figure 16:
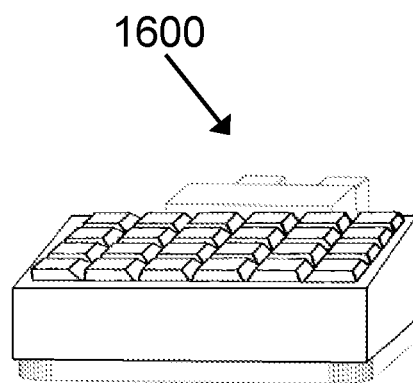
FIG. 16 depicts a front view of an adapted peripheral assembly including a keyboard in accordance with certain embodiments.

In certain embodiments, one or more peripherals 1210 may be attached to platform 530 to form an adapted peripheral assembly. The one or more peripherals may be attached with fasteners 1220 using one or more peripheral mounting holes 540 to form an adapted peripheral assembly. The one or more peripherals may include a joystick 1300 as shown in FIG. 13, a Computer Aided Design (CAD) controller 1400 as shown in FIG. 14, a track ball 1500 as shown in FIG. 15, or a keyboard 1600 as shown in FIG. 16. In certain embodiments, an adapted peripheral assembly may be formed by attaching one or more of a mouse, a virtual reality controller, a desk, a game controller such as a steering wheel, a flight yoke, a throttle, other game controllers known to one of skill in the art, or other computer input devices known to one of skill in the art to a modular peripheral assembly. Alternately, in other embodiments, one or more peripherals may be attached to platform 530 to form an adapted peripheral assembly using adhesive or other attachment methods known to one of skill in the art. In other embodiments, one or more peripherals may be purpose-built as a purpose-built peripheral assembly including one or more quick connectors 520 extending from the first side of the adapted peripheral assembly. In certain embodiments as shown in FIGS. 10-11 and 19, one or more quick connectors 520 may be adapted to slidably engage a corresponding one or more quick-connect receptacles 120 of modular receiver 100 to selectively connect and disconnect the modular peripheral adapter 500 and thus any attached accessories or peripherals to or from the modular receiver 100. In certain embodiments, once one or more peripherals have been attached to modular peripheral adapter 500 to form an adapted peripheral assembly, one or more quick connectors 520 of the adapted peripheral assembly may selectively engage a corresponding one or more quick-connect receptacles 120 of modular receiver 100 to quickly connect and disconnect the adapted peripheral assembly to and from modular receiver 100. The same may be true of a purpose-built peripheral assembly including one or more quick connectors 520 extending from the first side of the adapted peripheral assembly. In certain embodiments, a modular peripheral adapter 500, an adapted peripheral assembly or a purpose-built peripheral assembly may selectively be connected to modular receiver 100 without the need for any component disassembly or use of any tools. Upon disconnect of a modular peripheral adapter 500, an adapted peripheral assembly or a purpose-built peripheral assembly, the chair may be used for its original intended purpose. In certain embodiments, when a modular peripheral adapter 500, an adapted peripheral assembly or a purpose-built peripheral assembly is removed, the office, computer, or gaming chair may look and function similarly to the original, unaltered office, computer or gaming chair.

Figure 17:
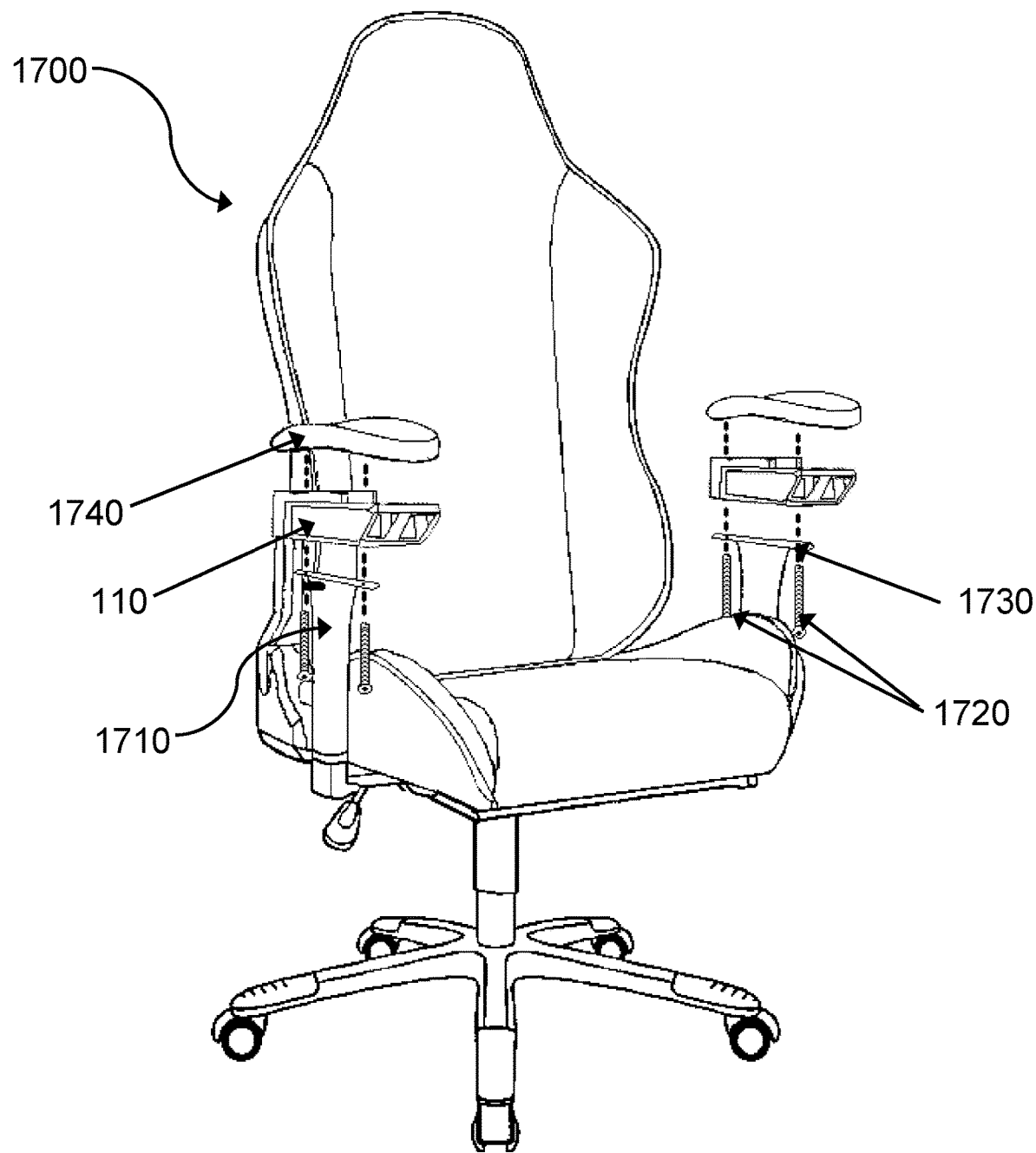
FIG. 17 depicts a perspective view of attaching two modular receivers to a chair in accordance with certain embodiments.

In certain embodiments, the one or more modular receivers may be attached to one or more arm rests of a chair 1700, which may be accomplished utilizing all existing arm rest components as shown in FIG. 17. In certain embodiments, a modular receiver may be attached to an arm rest 1710 by attaching one or more fasteners 1720 through existing holes in arm rest support 1730, through modular receiver housing 110 and into arm rest cushion 1740 as shown in FIG. 17. Alternately, in other embodiments, the modular receiver may be attached to a chair, desk, table, other piece of furniture using adhesive or other attachment techniques known to one of skill in the art. The one or more modular receivers may be left permanently attached to the chair, desk, table, or other piece of furniture without impairing the original functionality of the chair. In other embodiments, the modular receiver can be built into a chair, desk, table, or other piece of furniture to provide a permanent receiver for a modular peripheral adapter, which in some embodiments may be as shown in FIGS. 5-9.

Figure 18:
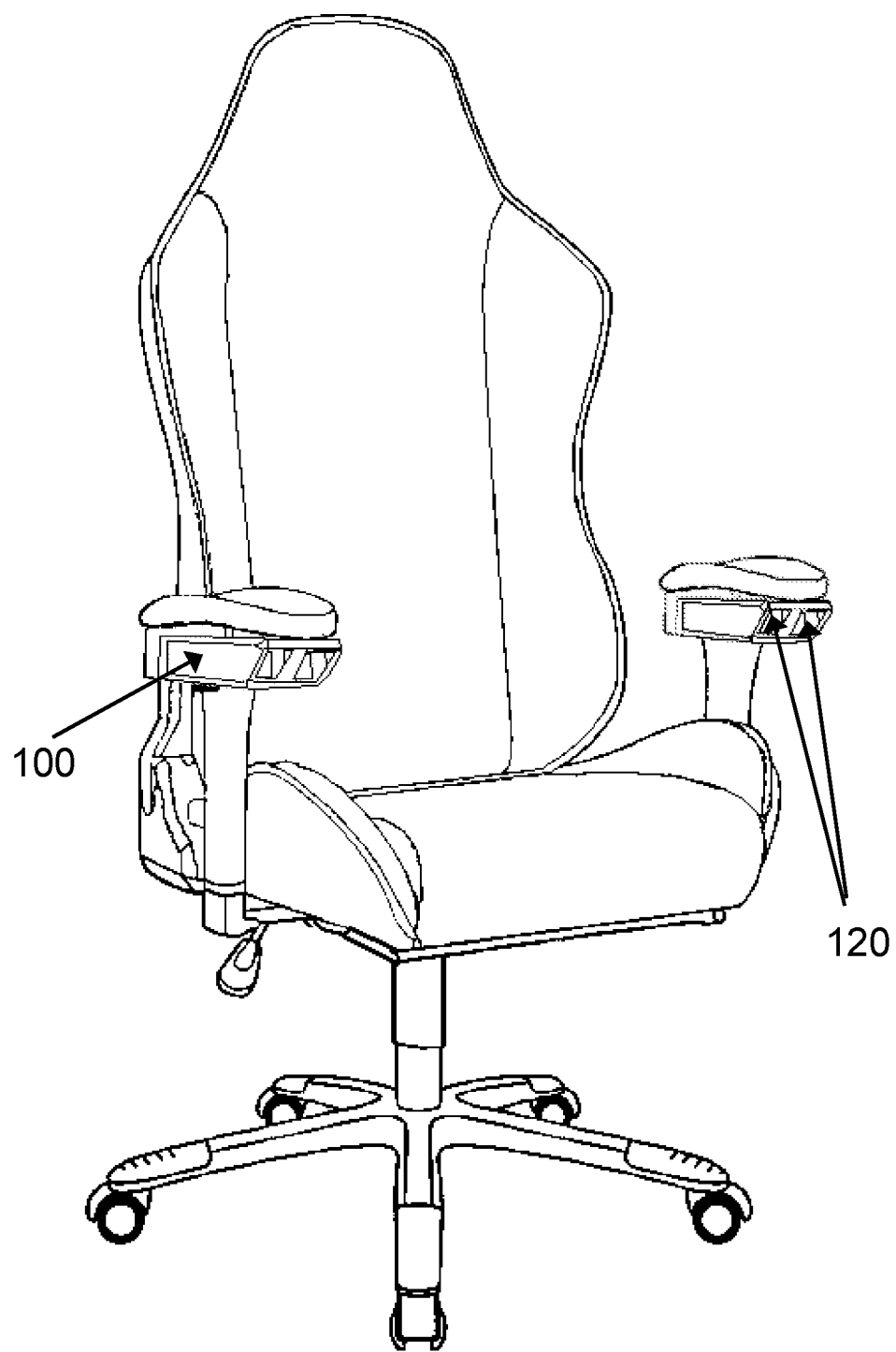
FIG. 18 depicts a perspective view of two modular receivers attached to a chair in accordance with certain embodiments.
Figure 20:
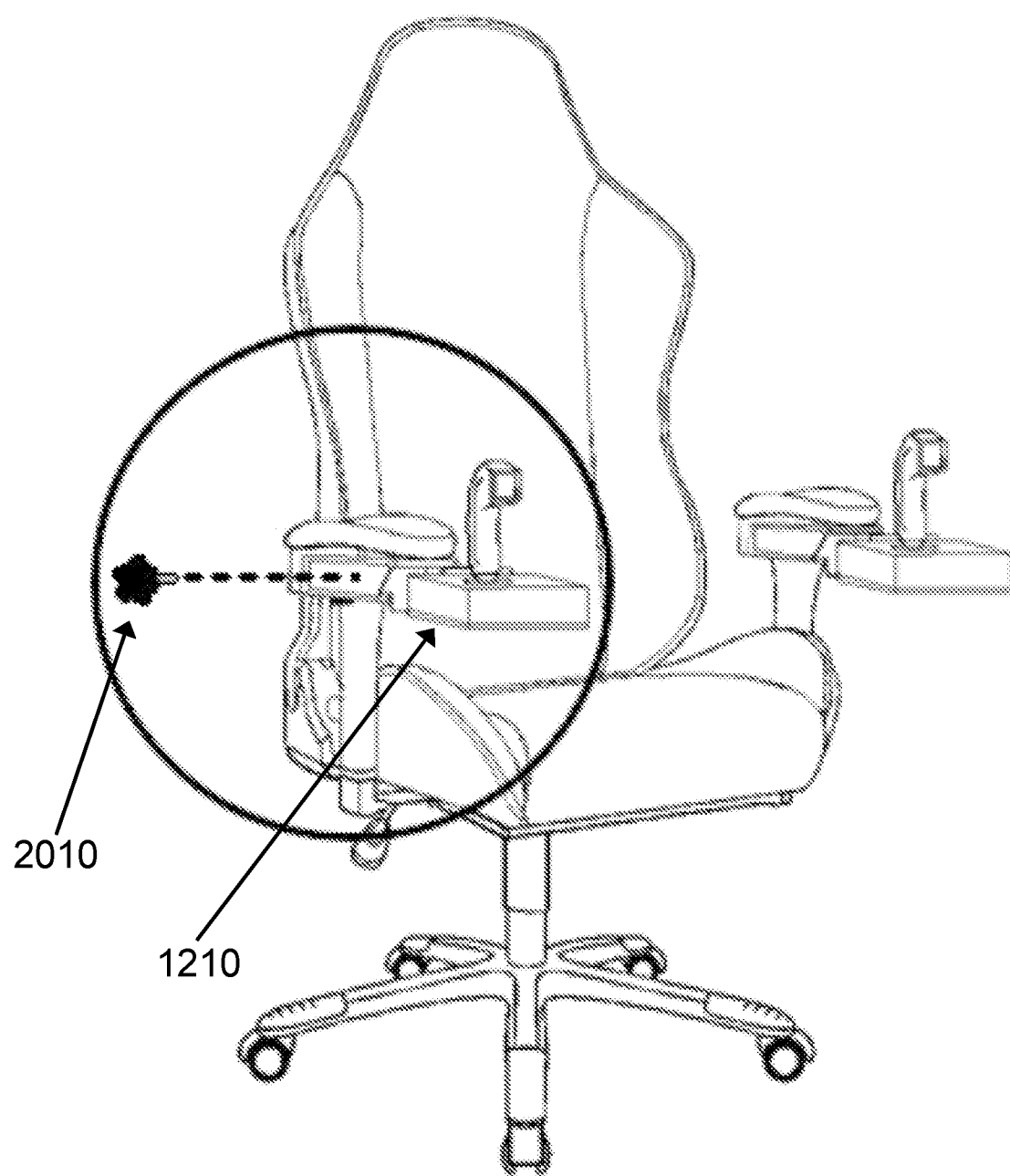
FIG. 20 depicts a perspective view of a retaining device for securing an adapted peripheral assembly to a modular receiver in accordance with certain embodiments.

In certain embodiments, modular receiver 100 may be installed between the arm rest support 1730 and the arm rest cushion 1740 as shown in FIG. 17, so that quick-connect receptacles 120 are disposed below arm rest cushions 1740 with the opening of quick-connect receptacles 120 facing forward to accept one or more quick connectors 520 of modular peripheral adapter 500 as shown in FIG. 18. As shown in FIG. 19, quick connectors 520 may be inserted in corresponding quick-connect receptacles 120 of receiver 100 and held in place by friction with or without a retaining or locking device. In certain embodiments as shown in FIG. 20, the retaining device may include without limitation a knob fastener 2010 inserted into the side of modular receiver 100, which may screw into quick connector 520 by hand without the use of any tools. In other embodiments, the retaining device may include one or more of a push button, a friction lock, a pin, a magnet, a clamp or other retaining devices known to one of skill in the art.

Figure 21:
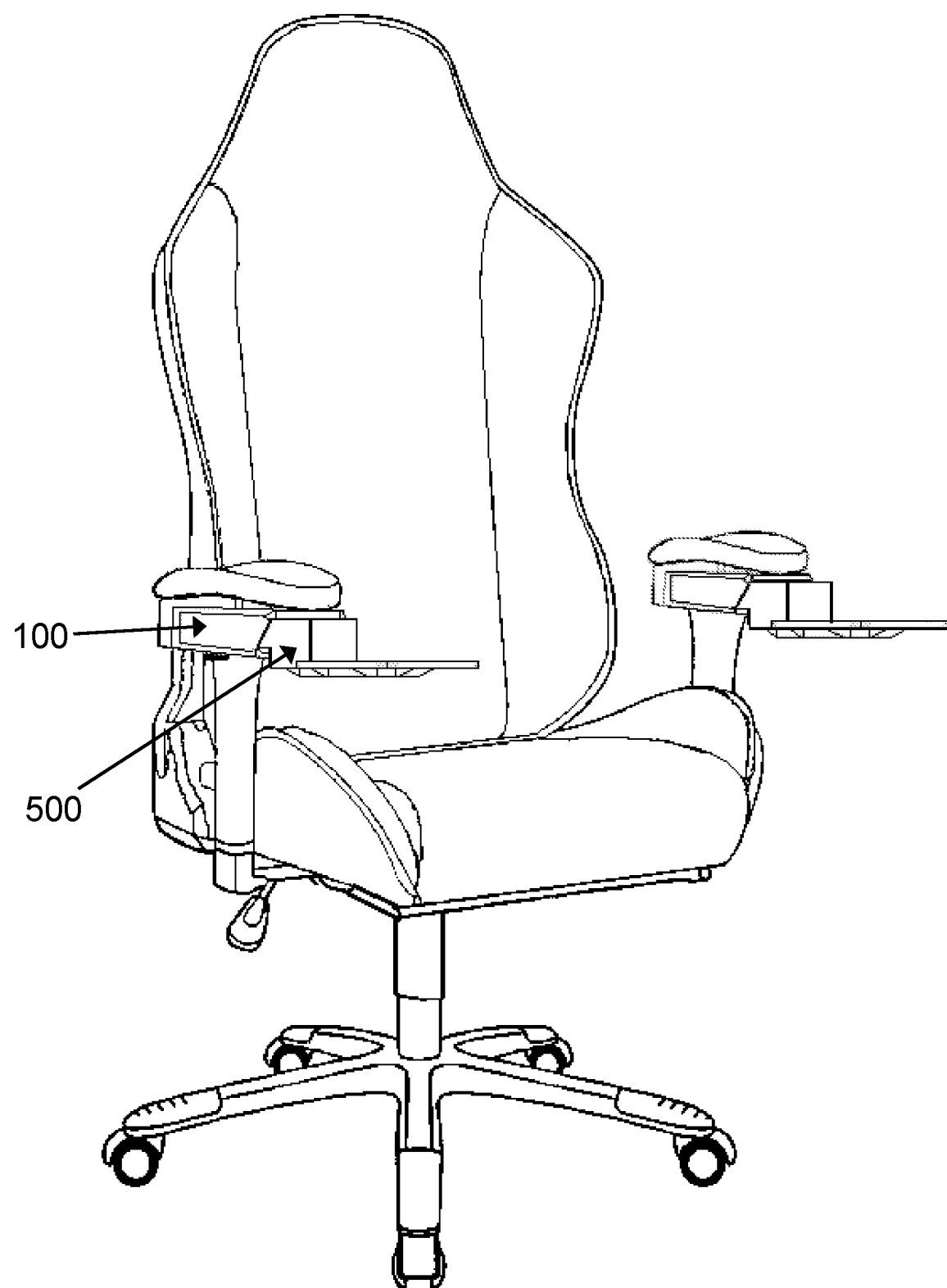
FIG. 21 depicts a perspective view of the chair of FIG. 18 with the two modular peripheral adapters attached to the two modular receivers in accordance with certain embodiments.
Figure 22:
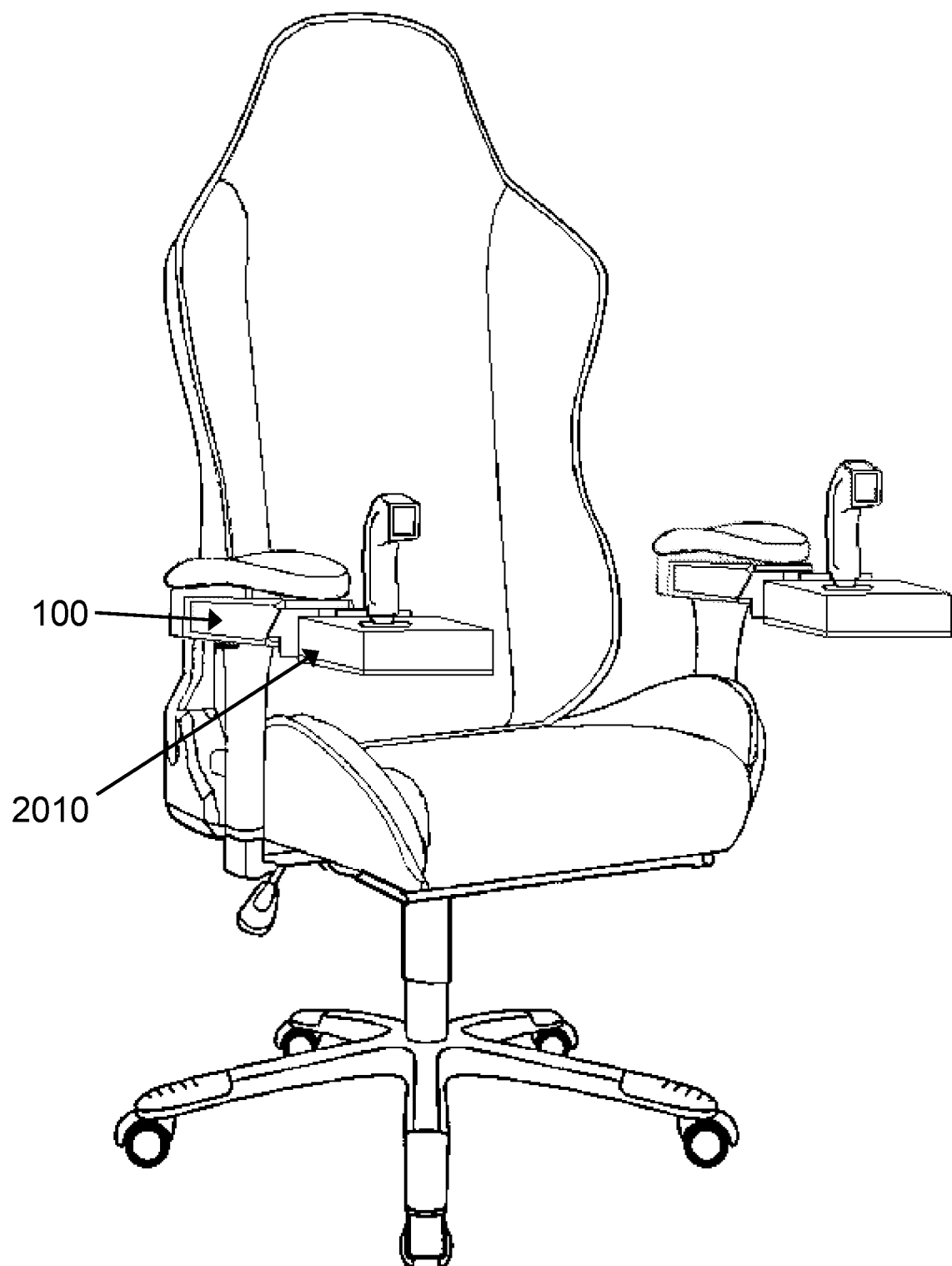
FIG. 22 depicts a perspective view of the chair of FIG. 18 with two peripherals attached to the two modular peripheral adapters in accordance with certain embodiments.

In certain embodiments as shown in FIG. 19, one or more modular peripheral adapters 500 may be quickly connected to or quickly disconnected from one or more modular housings 100 that have been attached to one or more arm rests of a chair 1700. As shown in FIG. 21, once one or more modular peripheral adapters 500 have been connected to a corresponding one or more modular housings 100, platforms 530 will be conveniently located to attach one or more peripherals 1210 for use by an operator of chair 1700 as shown in FIG. 22.

Figure 23:
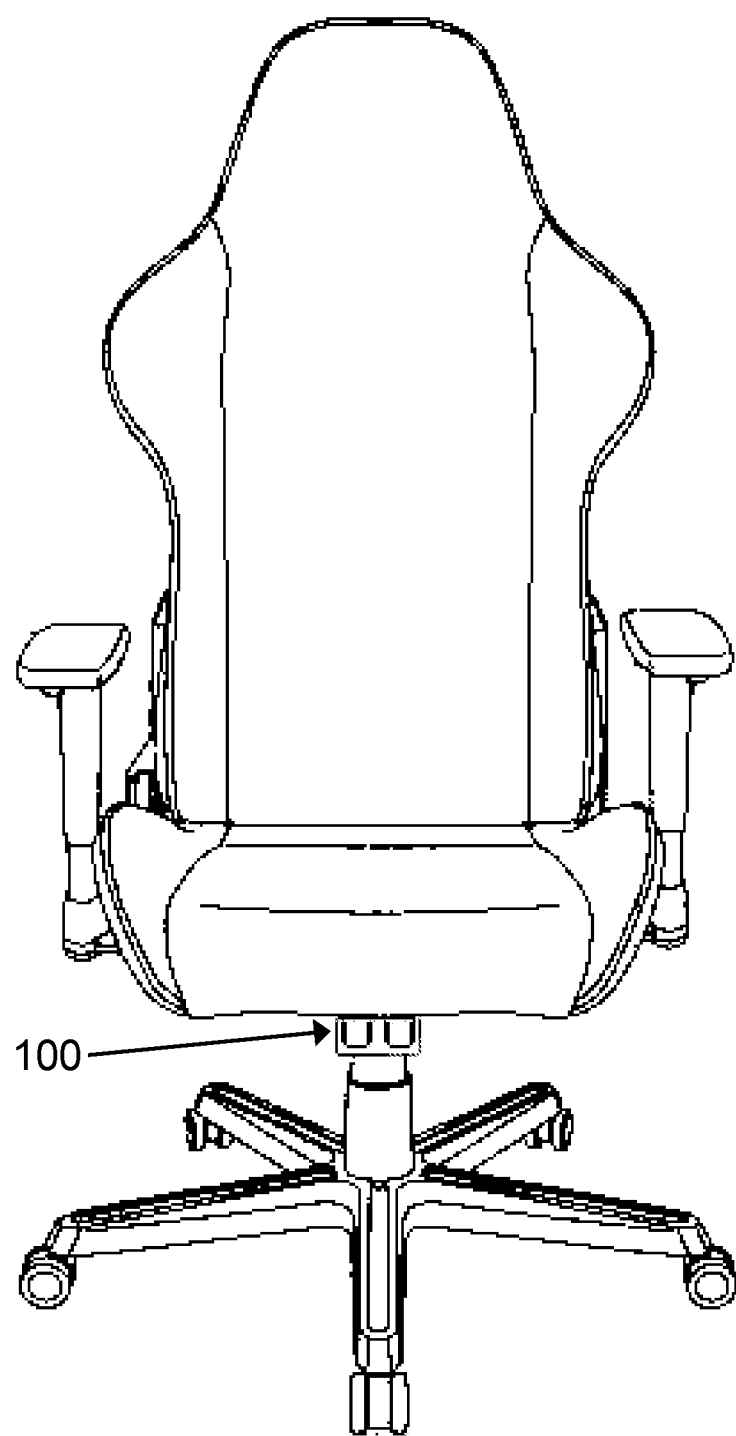
FIG. 23 depicts a front view of a chair with a modular receiver attached below the seating surface of the chair in accordance with certain embodiments.
Figure 24:
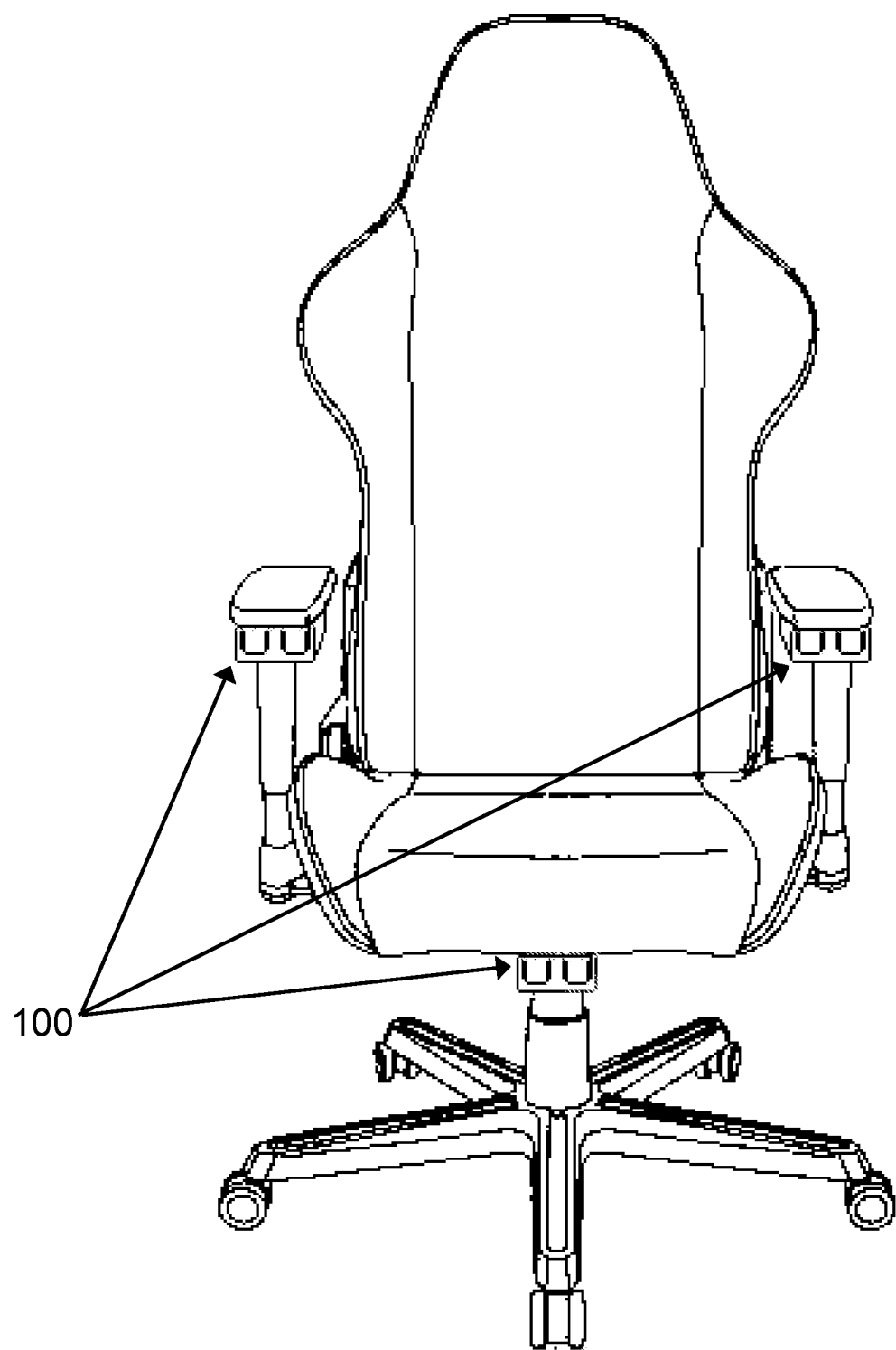
FIG. 24 depicts a front view of a chair with a modular receiver attached below the seating surface of the chair and under each arm rest of the chair in accordance with certain embodiments.
Figure 25:
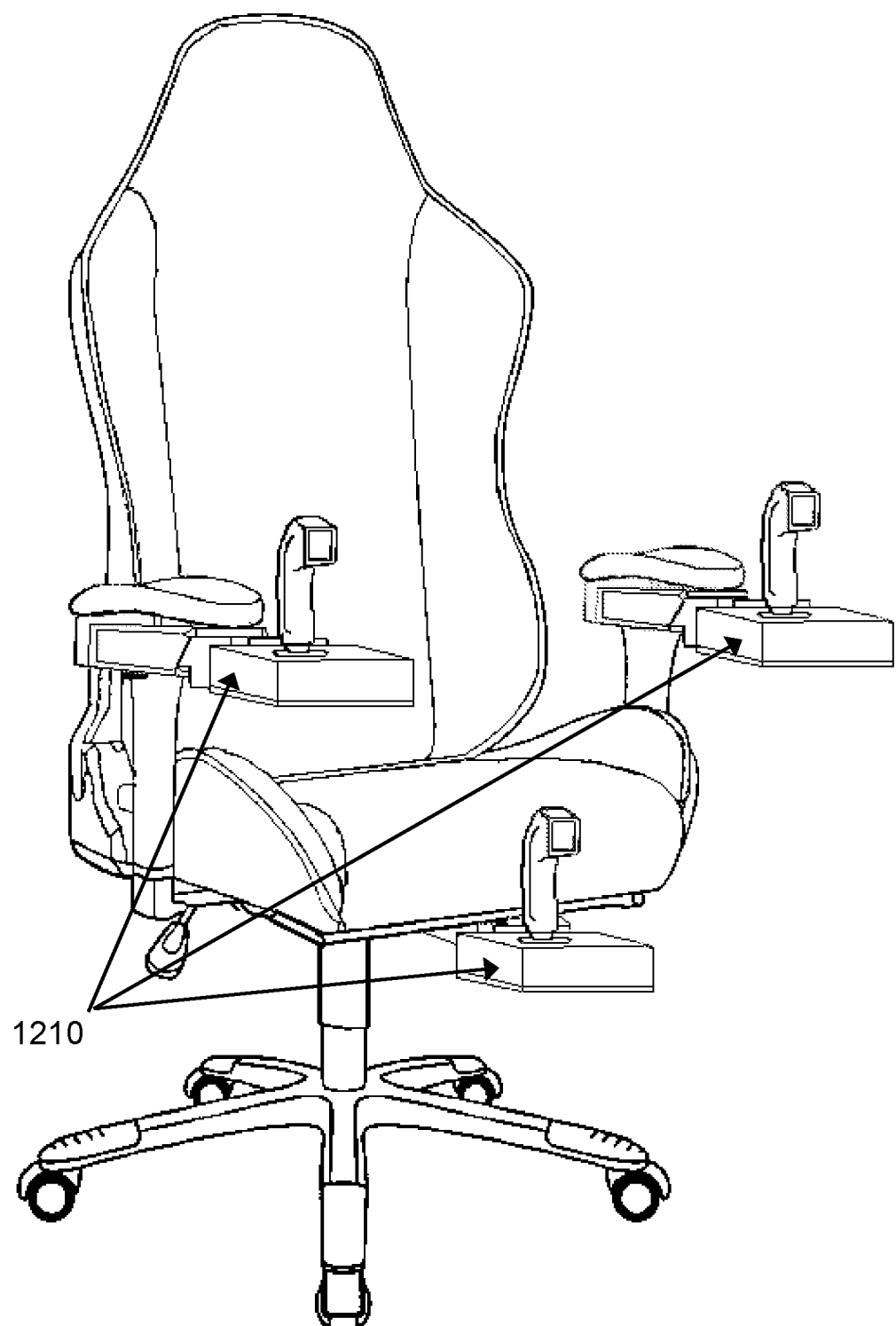
FIG. 25 depicts a front view of the chair of FIG. 18 with a modular peripheral adapter with an attached peripheral attached to each of the modular receivers attached below the seating surface of the chair and under each arm rest of the chair in accordance with certain embodiments.

In certain embodiments, modular housing 100 may be attached to chair 1700 below a seat of chair 1700 as shown in FIG. 23. In certain embodiments shown in FIG. 24, additional modular housings 100 may be attached under left and/or right arm rest cushions 1740 to provide additional attachment points for any combination of peripheral adapters 500, adapted peripheral assemblies or purpose-built peripheral assemblies as shown in FIG. 25.

Figure 26:
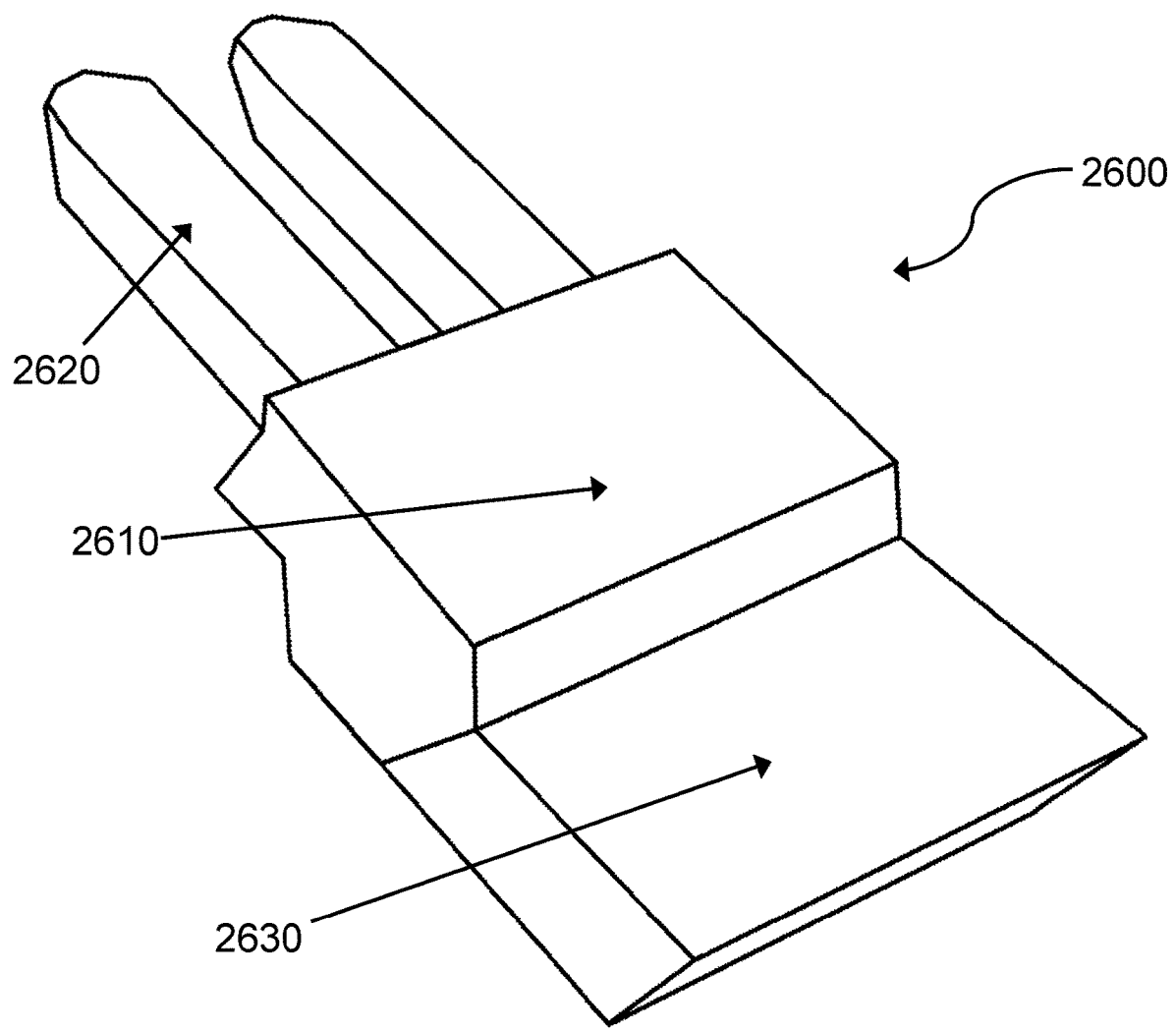
FIG. 26 depicts a perspective view of a modular peripheral adapter in accordance with certain embodiments.

In certain embodiments as shown in FIG. 26, a modular peripheral adapter 2600 may provide an adapter quick-connection to a modular housing 100. Modular peripheral adapter 2600 may include a housing 2610 with a first side and a second side opposite the first side, one or more quick connectors 2620 extending from the first side of housing 2610, and a platform 2630 extending from the second side of the housing 2610.

Figure 27:
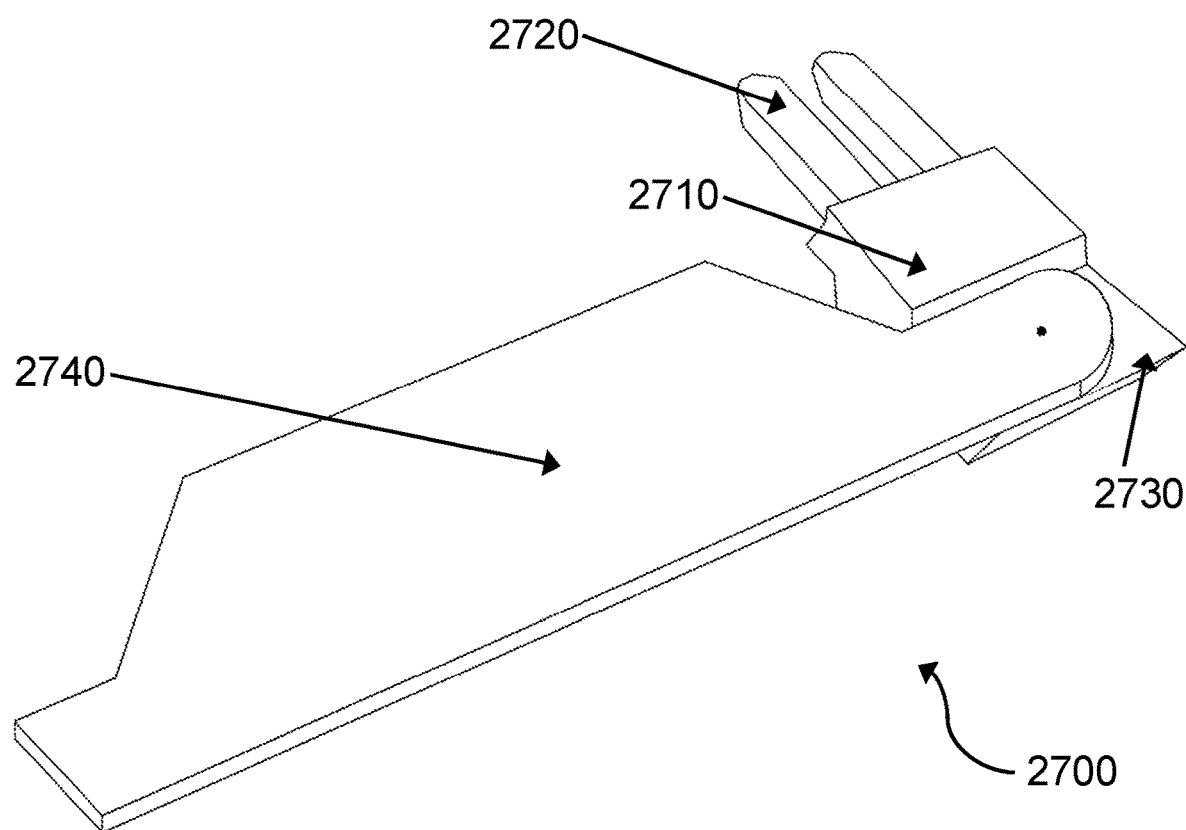
FIG. 27 depicts a perspective view of a modular peripheral adapter with a desk extension in accordance with certain embodiments.

In certain embodiments as shown in FIG. 27, a modular peripheral adapter 2700 may provide an adapter for quick-connection to and quick disconnection from a modular housing 100. Modular peripheral adapter 2700 may include a housing 2710 with a first side and a second side opposite the first side, one or more quick connectors 2720 extending from the first side of housing 2710, and first platform 2730 extending from the second side of the housing 2710. In certain embodiments, modular peripheral adapter 2700 may include a desk surface 2740 pivotably attached to first platform 2730.

Figure 28:
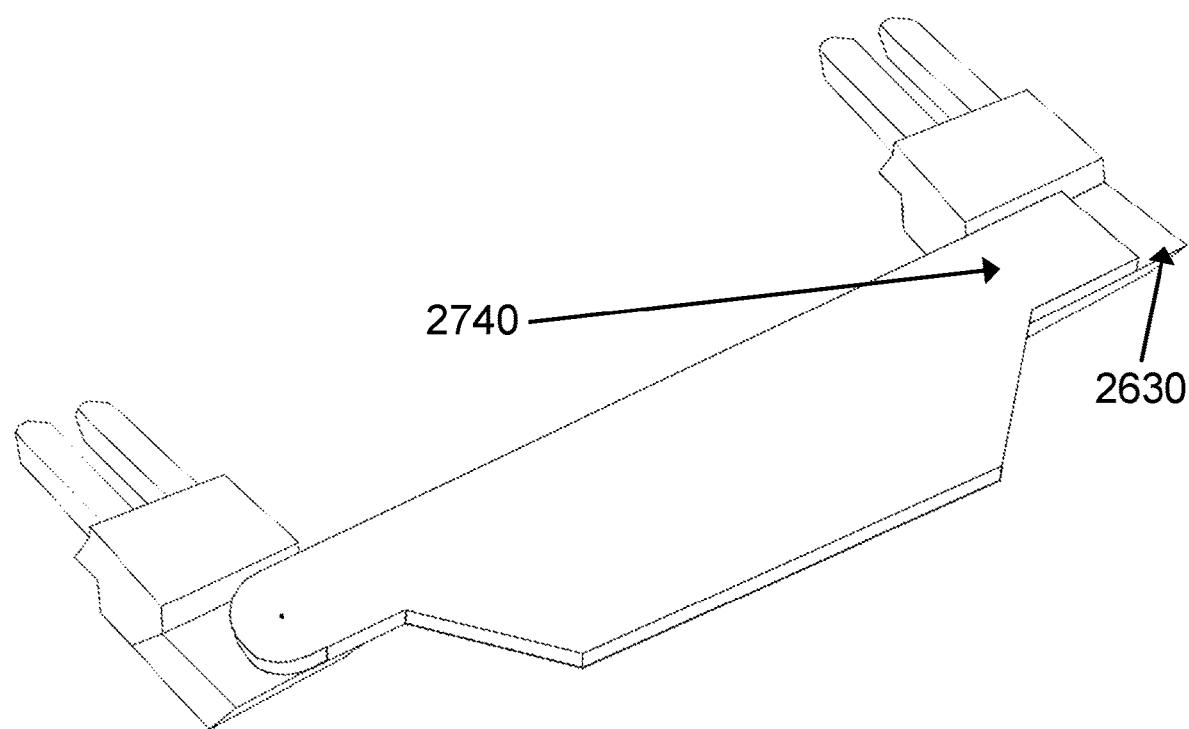
FIG. 28 depicts a perspective view of the modular peripheral adapter of FIG. 20 and the modular peripheral adapter with a desk extension of FIG. 21 in accordance with certain embodiments.
Figure 29:
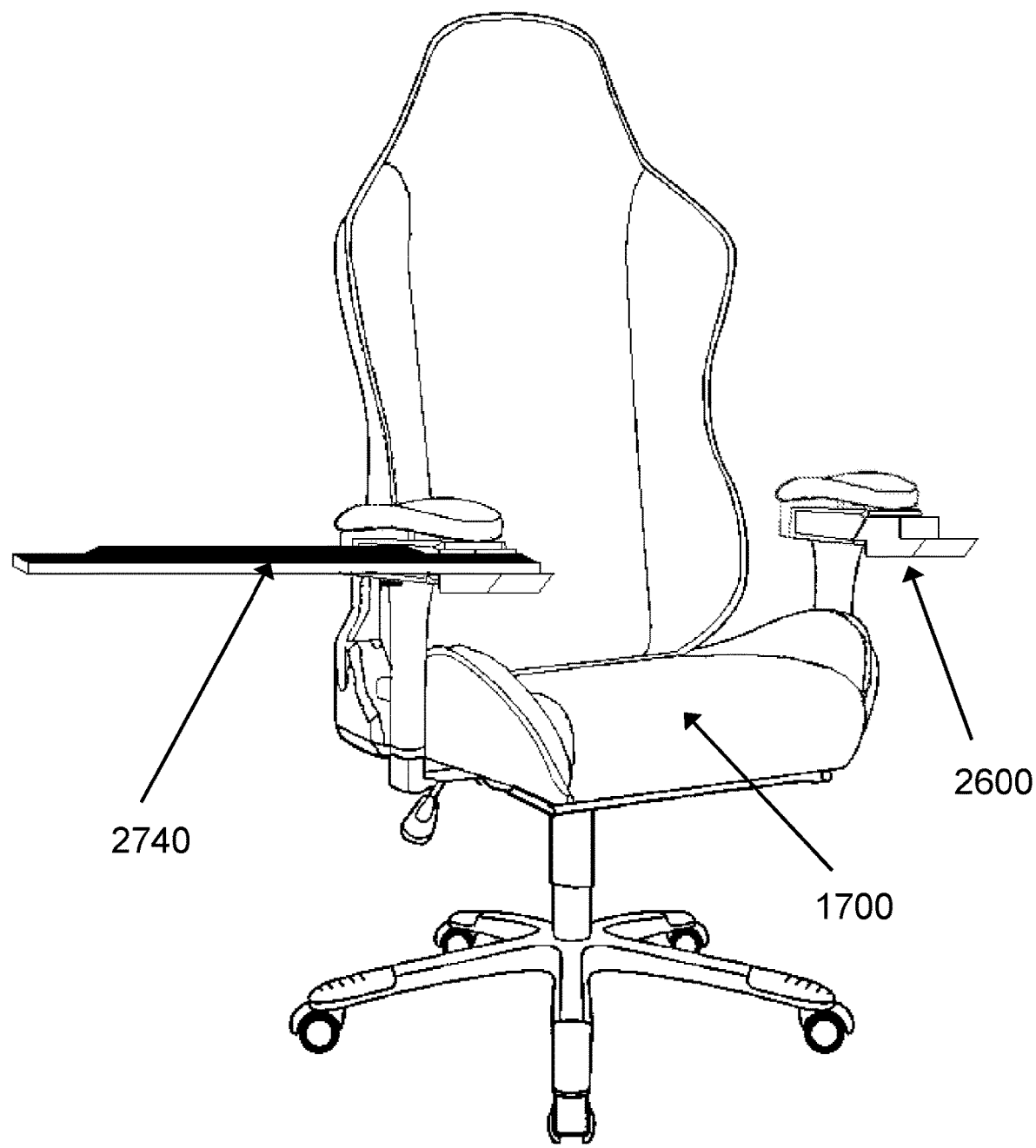
FIG. 29 depicts a perspective view of the chair of FIG. 18 with the modular peripheral adapter of FIG. 20 attached to the modular receiver attached under the left arm rest and the modular peripheral adapter with a desk extension of FIG. 21 attached to the modular receiver attached under the right arm rest with the rotatable desk surface in an open position in accordance with certain embodiments.
Figure 30:
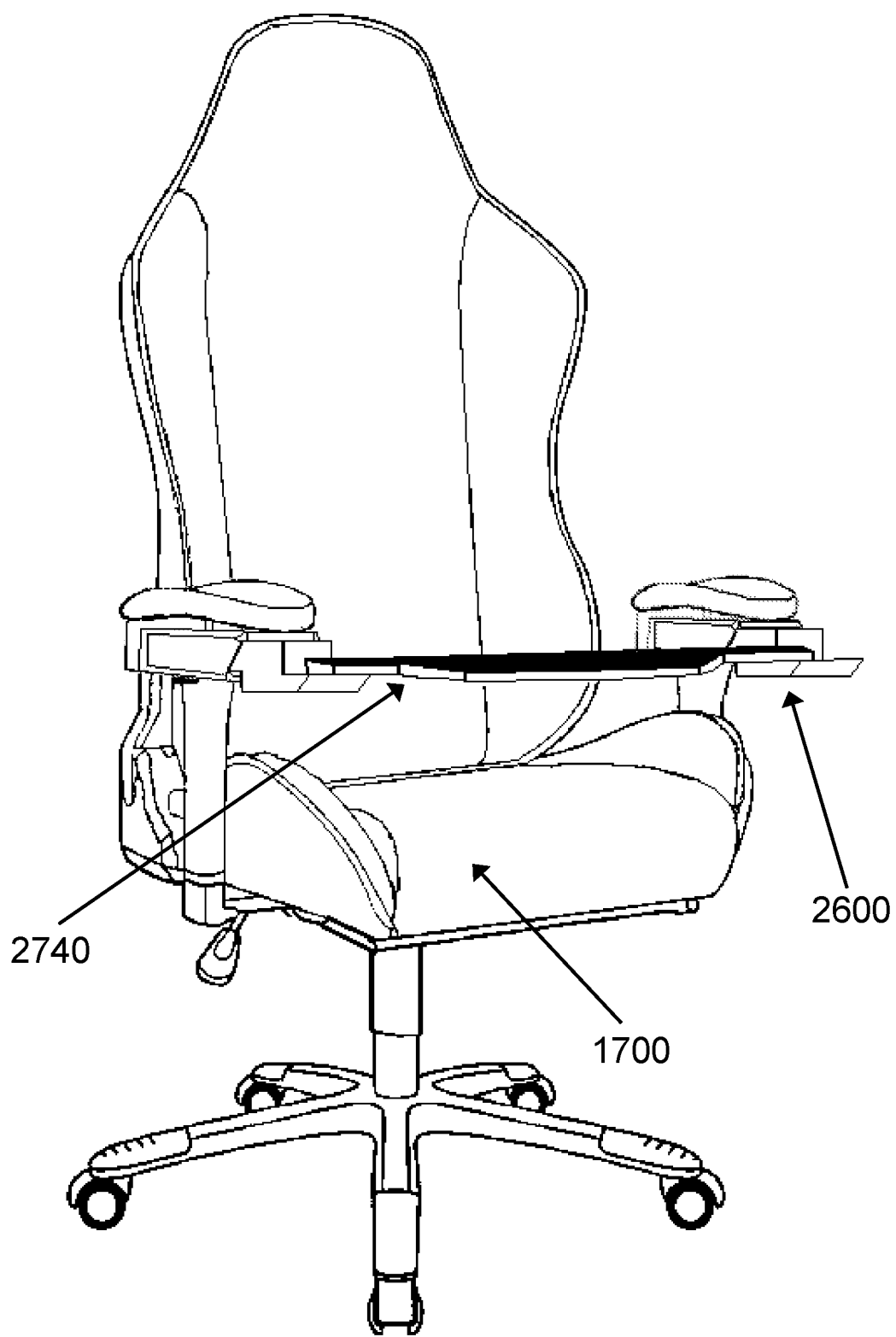
FIG. 30 depicts a perspective view of the chair of FIG. 18 with the modular peripheral adapter of FIG. 20 attached to the modular receiver attached under the left arm rest and the modular peripheral adapter with a desk extension of FIG. 21 attached to the modular receiver attached under the right arm rest with the rotatable desk surface in a closed position in accordance with certain embodiments.
Figure 45:
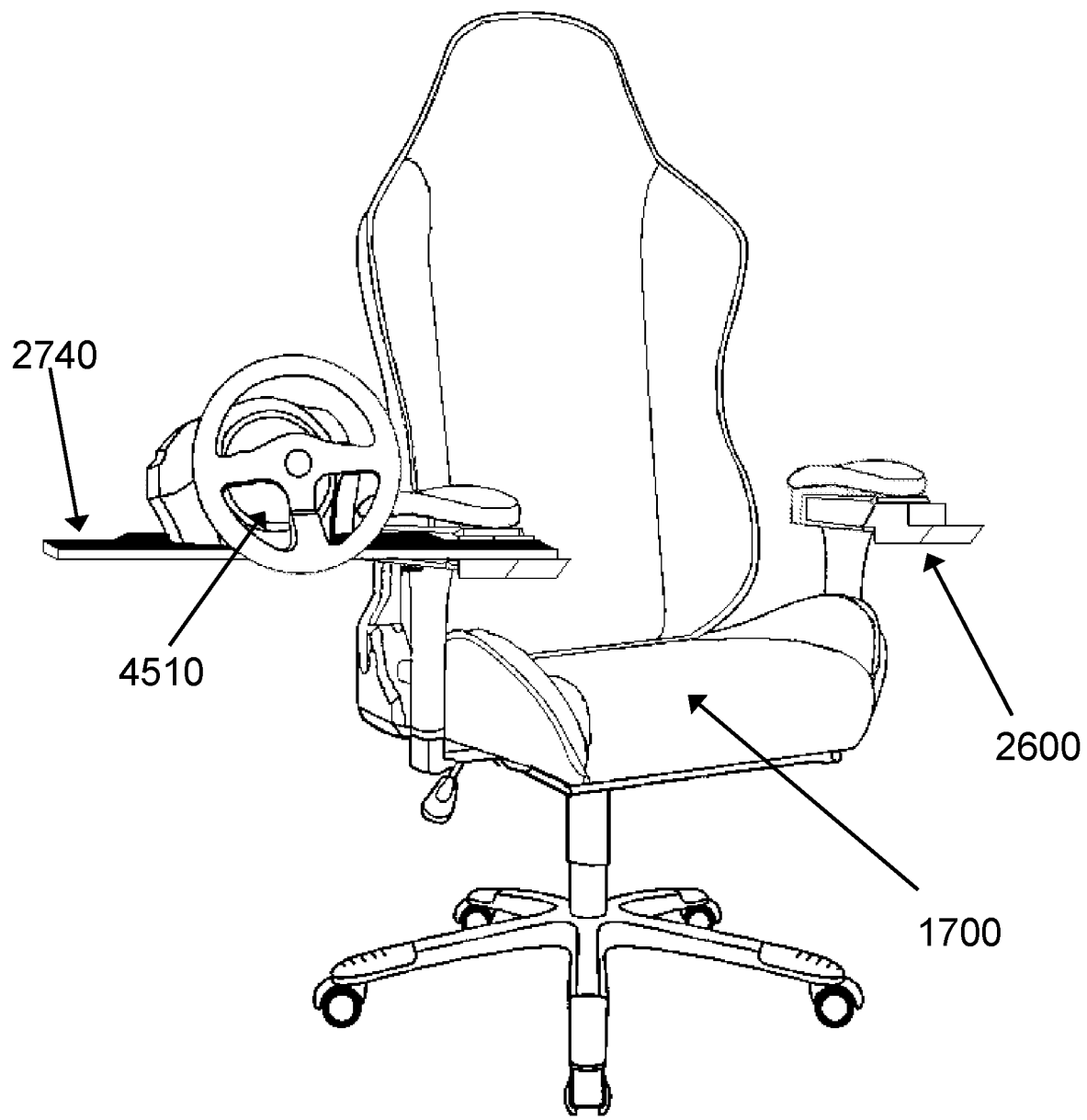
FIG. 45 depicts a perspective view the embodiment of FIG. 29 with a steering wheel peripheral attached to the desk surface and the desk surface in a second position in accordance with certain embodiments.
Figure 46:
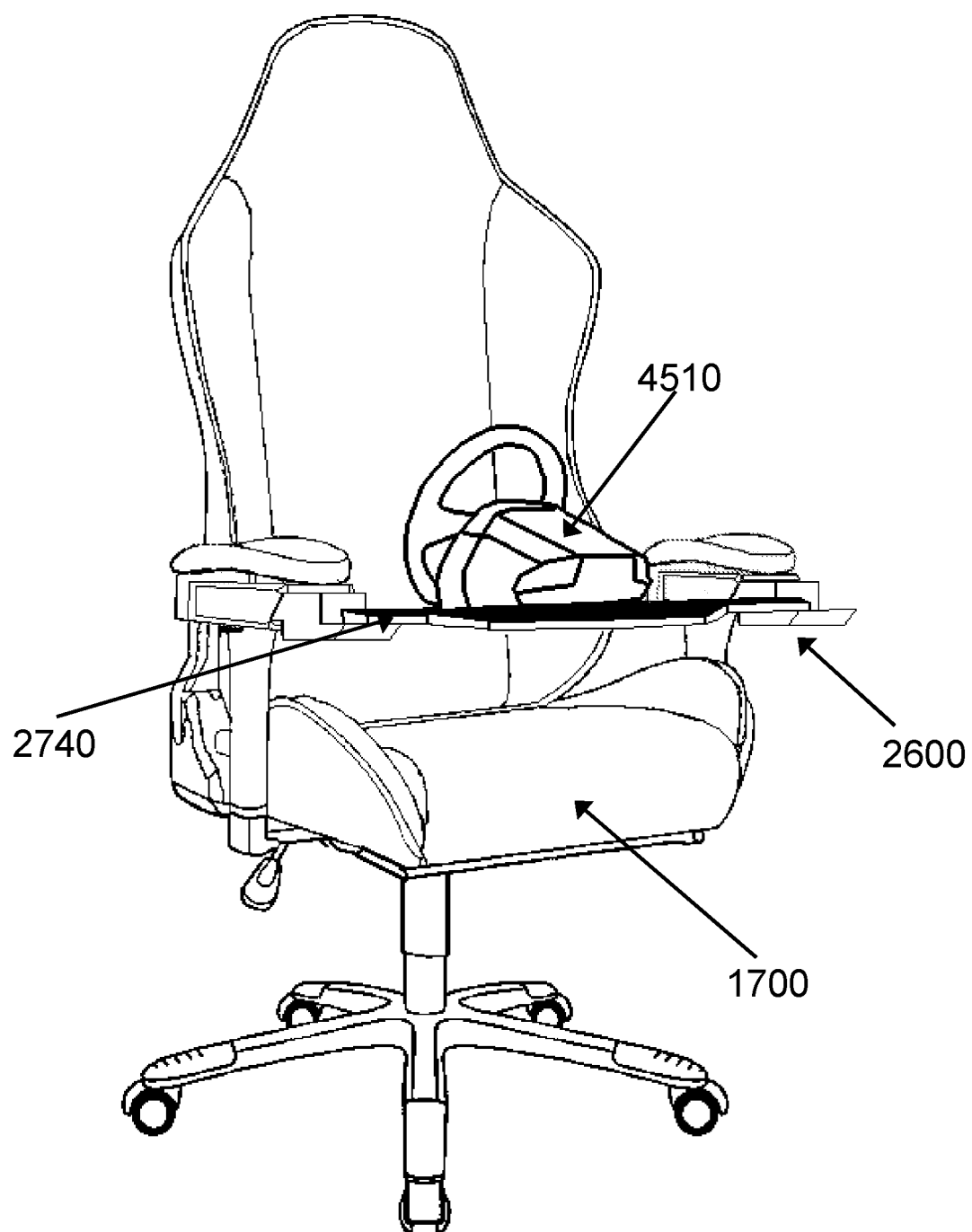
FIG. 46 depicts a perspective view the embodiment of FIG. 29 with a steering wheel peripheral attached to the desk surface and the desk surface in a first position in accordance with certain embodiments.

In certain embodiments, the desk surface may be rotated between a first position shown in FIG. 30 wherein the desk surface 2740 of the first modular peripheral adapter 2700 is disposed across the gap between the first arm rest and the second arm rest and a second position shown in FIG. 29, wherein the desk surface does not entirely block a gap between the first arm rest and the second arm rest to permit a user to access a seating surface of the chair without removing the modular peripheral adapter from the chair. In certain embodiments, the second position may place the desk surface 2740 in a position rotated 180 degrees from the first position surface as shown in FIG. 29, 90 degrees from the first position or some other angle of rotation from the first position so that a user may freely access chair 1700 without removing modular peripheral adapter 2700 from modular housing 100. When in the first position, the desk surface 2740 may engage a second platform 2630 of a second modular peripheral adapter 2600 removably attached to a modular housing 100 attached to or built into a second arm rest as shown in FIGS. 28 and 30. In certain embodiments, in the first position the desk surface 2740 may be supported by platform 2630, either by gravity, friction or other retention methods known to one of skill in the art. In certain embodiments, the first position shown in FIGS. 28 and 30. In the second position as shown in FIG. 29, the desk surface 2740 may be rotated opposite second modular housing 2630 so that a user may freely access chair 1700 without removing modular peripheral adapter 2700 from modular housing 100. In certain embodiments, the desk surface 2740 may include a first one or more magnets, the second modular peripheral adapter 2600 may include a second one or more magnets and the desk surface 2740 may be configured to engage the second modular peripheral adapter 2600 by positioning the first one or more magnets to magnetically engage the second one or more magnets when the desk surface 2740 is in the first position. In certain embodiments, the desk surface may be movable between the first position and the second position via sliding, rotating, or a combination thereof. In certain embodiments as shown in FIGS. 45 and 46, one or more peripherals may be attached to desk surface 2740, such as for example and without limitation steering wheel 4510 for use in connection with applications requiring or enhanced by a steering wheel input device.

In certain embodiments as shown in FIGS. 26-30, a first modular peripheral adapter 2700 may include a desk surface 2740 that may be of a length sufficient to extend from a first arm rest of a chair to a second arm rest of a chair to engage a second modular peripheral adapter 2600 removably attached to the second arm rest. In certain embodiments, the desk surface 2740 may slidably engage the first modular peripheral adapter 2700 to allow the desk surface 2740 to slide laterally relative to the first arm rest to adjust for different spacing between the first arm rest and the second arm rest. In certain embodiments, the desk surface 2740 may be movable, via sliding, rotating, or a combination thereof, between a first position shown in FIG. 30 wherein the desk surface 2740 of the first modular peripheral adapter 2700 is disposed across the gap between the first arm rest and the second arm rest and a second position shown in FIG. 29, wherein the desk surface 2740 does not entirely block a gap between the first arm rest and the second arm rest to permit a user to access a seating surface of the chair 1700 without removing the first modular peripheral adapter 2700 from the chair. When in the first position, the desk surface may engage a second platform 2630 of a second modular peripheral adapter 2600 removably attached to a modular housing 100 attached to or built into a second arm rest as shown in FIGS. 28 and 30.

In certain embodiments, a desk surface may be attached to a first modular peripheral adapter and a second modular peripheral adapter spaced apart from the first modular peripheral adapter so that the first modular peripheral adapter may selectively engage a first modular receiver attached to a first arm rest while the second modular peripheral adapter engages a second modular receiver attached to a second arm rest of the chair to dispose the desk surface between the first and second arm rests. In certain embodiments, the desk surface may be rotatably attached to the first modular peripheral adapter so that the desk surface may be rotated to selectively quick-connect the second modular peripheral adapter to and disconnect it from the second modular receiver to allow rotation of the desk surface between a first position wherein the desk surface is disposed across the gap between the first arm rest and the second arm rest and a second position, wherein the desk surface does not entirely block a gap between the first arm rest and the second arm rest to permit a user to access a seating surface of the chair without removing the modular peripheral adapter from the chair.

Figure 31:
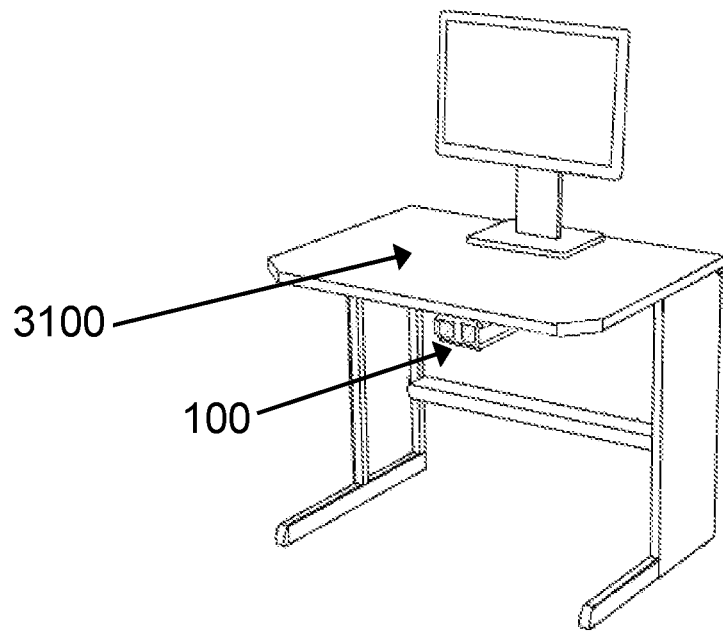
FIG. 31 depicts a perspective view of a modular receiver attached to a computer desk in accordance with certain embodiments.
Figure 32:
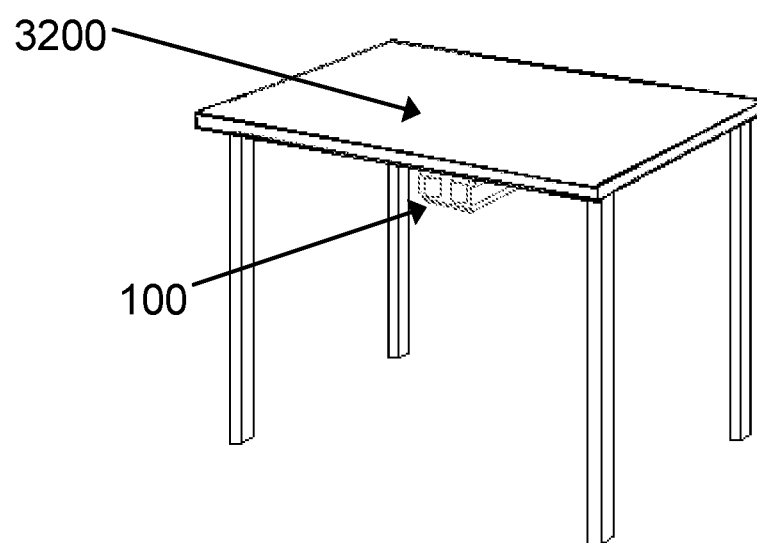
FIG. 32 depicts a perspective view of a modular receiver attached to a table in accordance with certain embodiments.

In certain embodiments, the one or more modular receivers 100 can be attached to desk 3100 as shown in FIG. 31. In certain embodiments, the one or more modular receivers 100 can be attached to table 3200 as shown in FIG. 32, or other type of furniture known to one of skill in the art or to any fixed location such as a ceiling, wall or other location where a user would one to access peripherals or accessories. In certain embodiments one or more mounting holes 130 in modular receiver 100 can accommodate various fasteners to enable installation on numerous materials and surfaces. In certain embodiments, the attachment of one or more modular receivers 100 may convert any desk, table, or other furniture into a specialized work station or gaming station through the quick-connect attachment of one or more modular peripheral adapters 500, adapted peripheral assemblies or purpose-built peripheral assemblies or any combinations thereof to a corresponding one or more modular receivers that have been attached to the desk, table or other furniture. The desk, table, or other furniture may be quickly reverted to its original use to regular desk, table, or other furniture upon quick-disconnect removal of the one or more modular peripheral adapters 500, adapted peripheral assemblies or purpose-built peripheral assemblies or any combinations thereof from corresponding one or more modular receivers that have been attached to the desk, table or other furniture. In certain embodiments, the removable modular attachment system can convert an ordinary desk chair or desk into a simulator chair or a professional grade control station and revert it back to original intended use with minimal time or expertise for a fraction of the cost of a dedicated simulator or control chair and without the need for storage space for the second chair.

Figure 33:
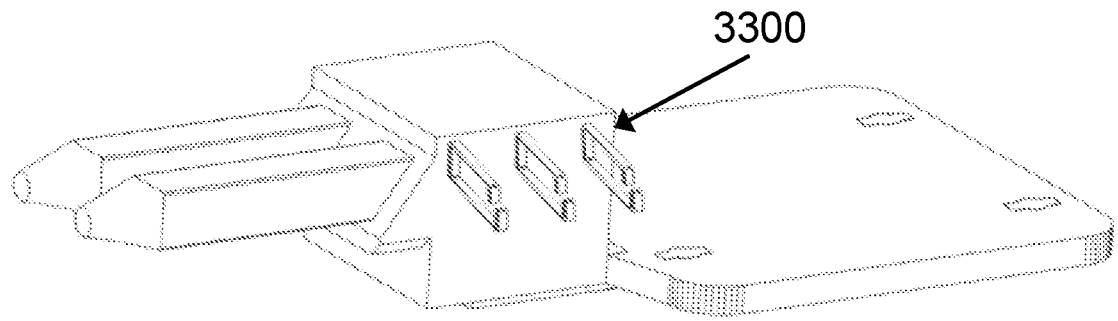
FIG. 33 depicts a perspective view of a modular peripheral adapter including a cable management accessory in accordance with certain embodiments.
Figure 34:
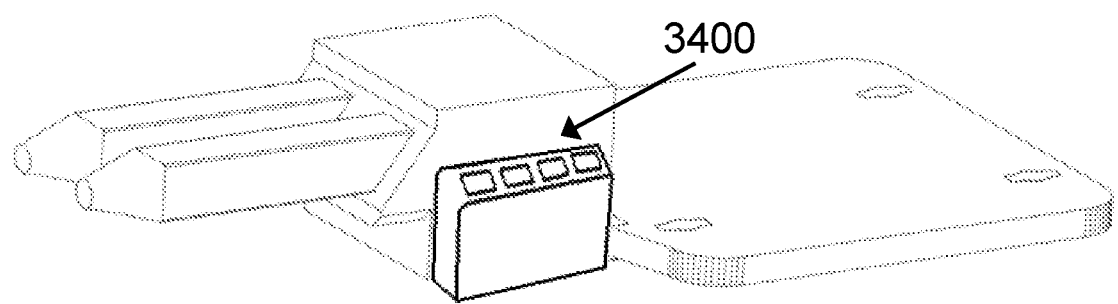
FIG. 34 depicts a perspective view of a modular peripheral adapter including a universal serial bus (USB) hub accessory in accordance with certain embodiments.
Figure 35:
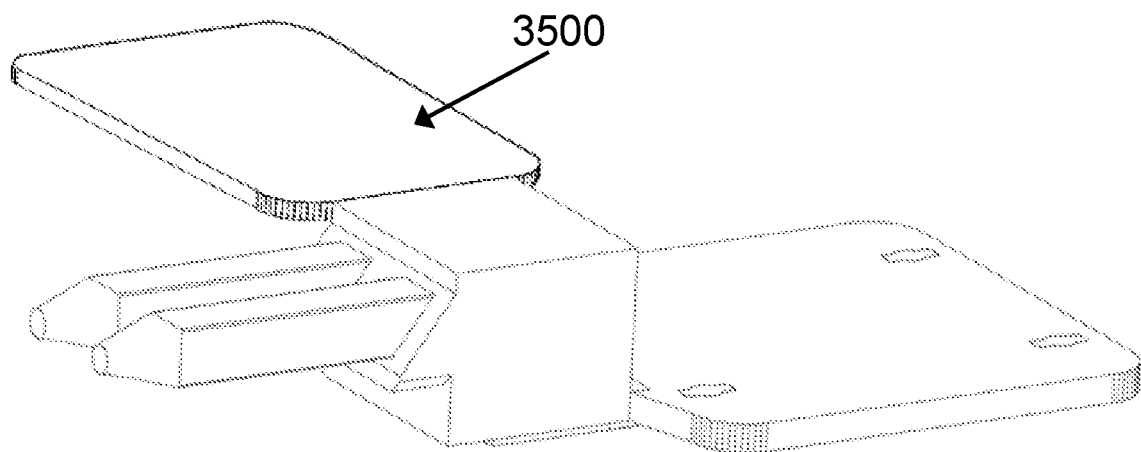
FIG. 35 depicts a perspective view of a modular peripheral adapter including a mouse pad accessory in accordance with certain embodiments.
Figure 36:
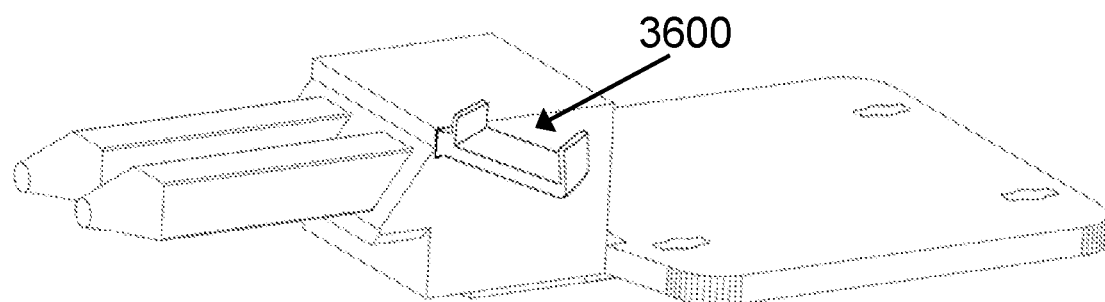
FIG. 36 depicts a perspective view of a modular peripheral adapter including a virtual reality controller holder accessory in accordance with certain embodiments.
Figure 37:
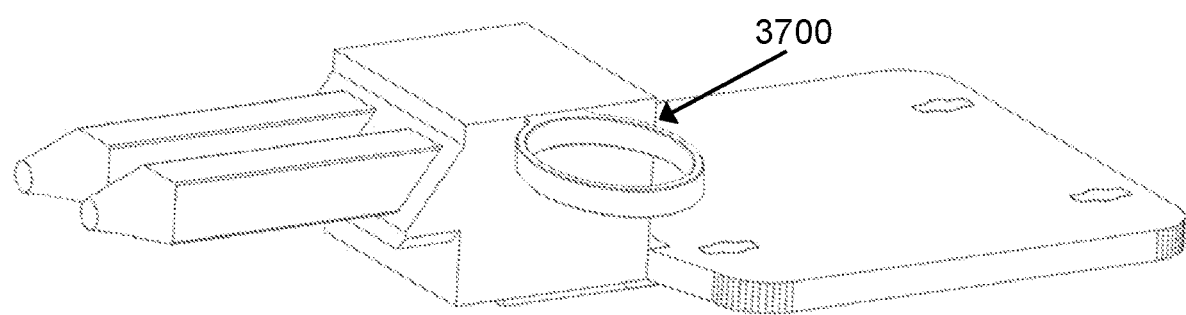
FIG. 37 depicts a perspective view of a modular peripheral adapter including a cup holder accessory in accordance with certain embodiments.

In certain embodiments, one or more accessories may be attached to modular peripheral adapter 500. In certain embodiments, accessories may include without limitation one or more of cable management adapter 3300 as shown in FIG. 33, universal serial bus hub 3400 as shown in FIG. 34, mouse pad 3500 as shown in FIG. 35, a virtual reality controller holder 3600 as shown in FIG. 36, a cup holder 3700 as shown in FIG. 37, a headset holder, a tablet holder, a phone holder, a game controller holder, a remote holder, a light, a keyboard and a rumble pack or other tactile feedback device or any combination thereof.

Figure 38:
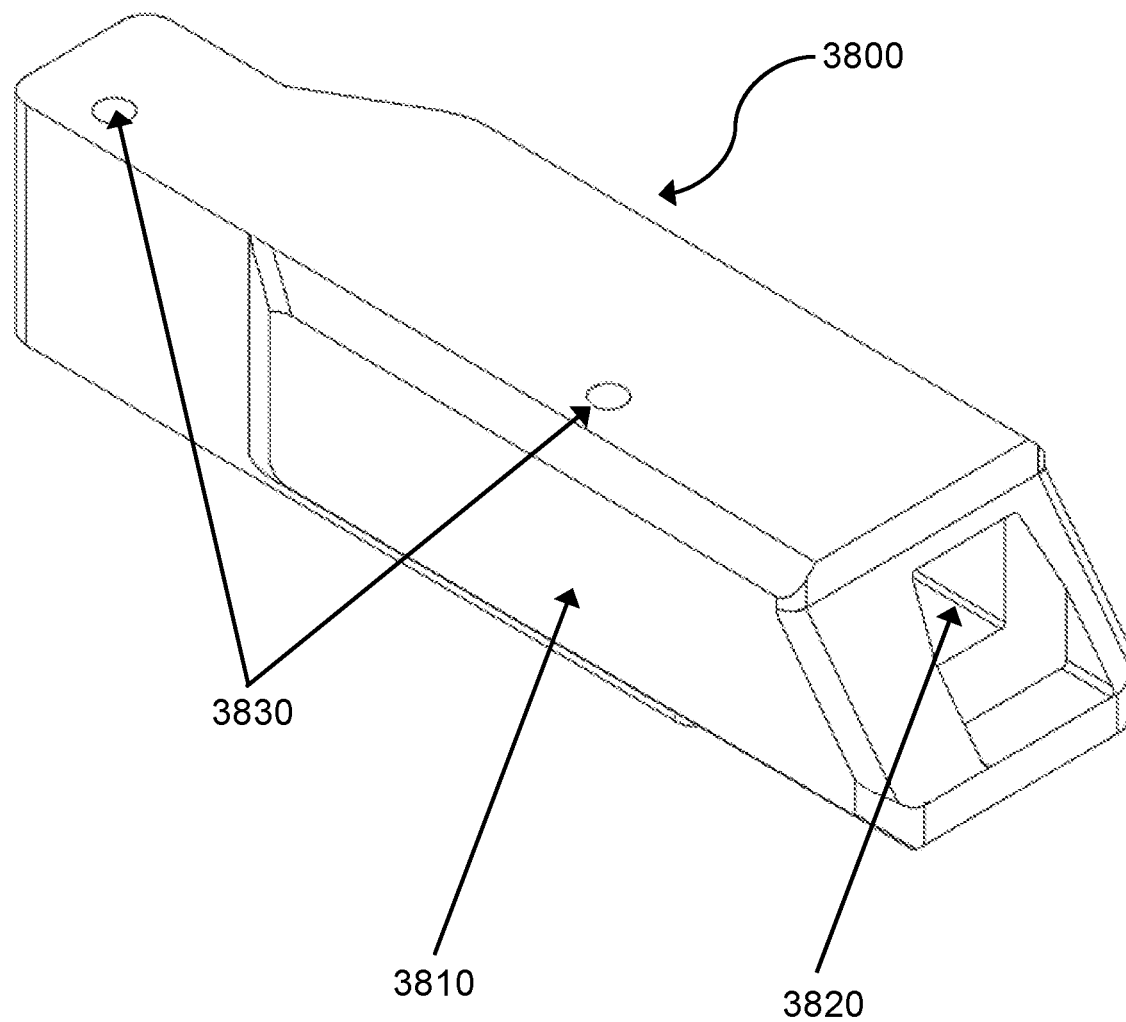
FIG. 38 depicts a perspective view of a modular receiver in accordance with certain embodiments.
Figure 39:
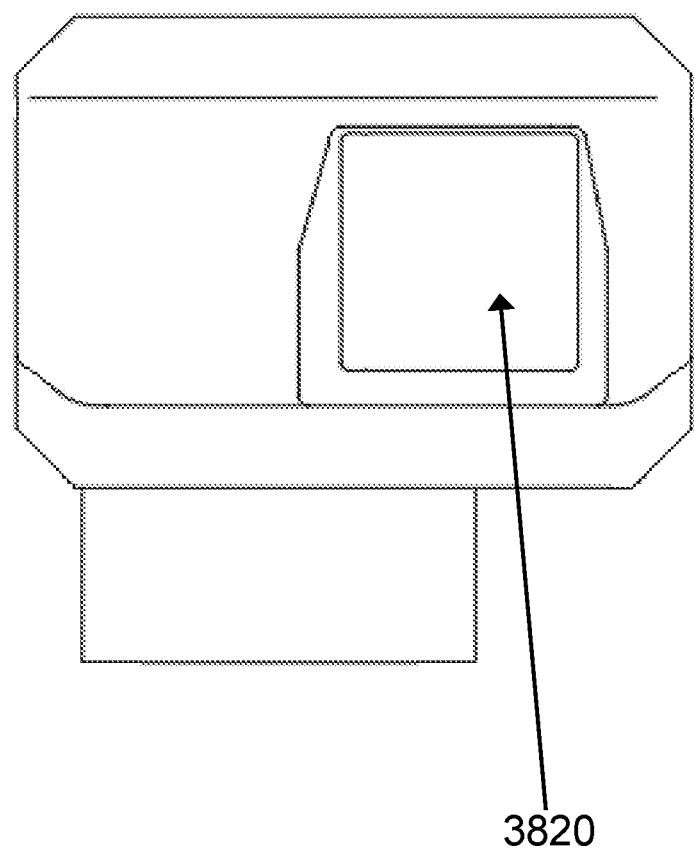
FIG. 39 depicts a front view of a modular receiver in accordance with certain embodiments.
Figure 40:
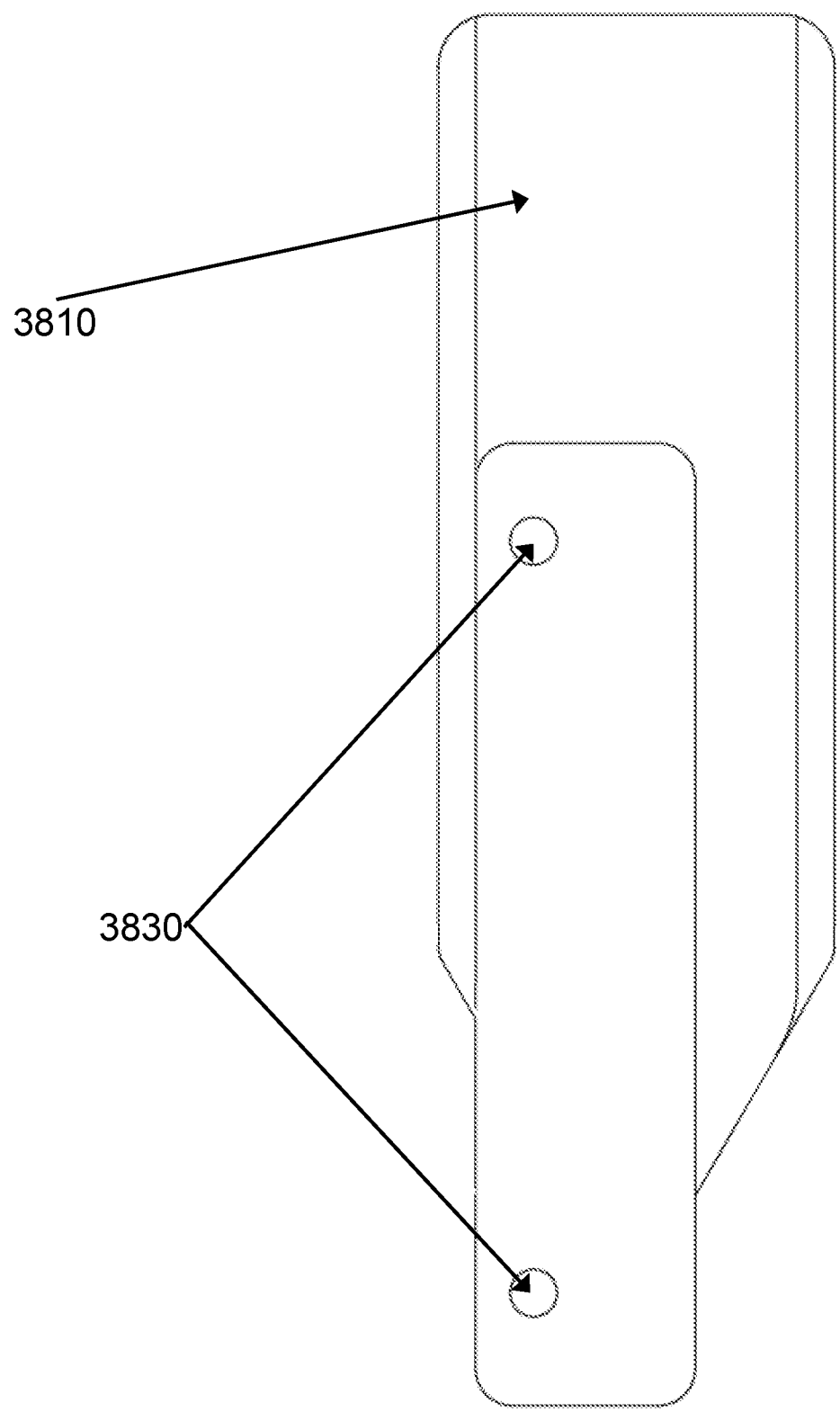
FIG. 40 depicts a top view of a modular receiver in accordance with certain embodiments

In certain embodiments, the removable modular attachment system may include one or more modular receivers that may be configured in different shapes and sizes and with different numbers of quick-connect receptacles to fit a particular type or types of furniture. In certain embodiments as shown in FIGS. 38-40, modular receivers 3800 may include a housing 3810 that defines a single quick-connect receptacle 3820 rather than the embodiment of FIGS. 1-4 in which housing 100 may define a plurality of quick-connect receptacles 120, with two quick-connect receptacles 120 shown as a non-limiting example. In certain embodiments, single quick-connect receptacle 3820 may be configured to receive a corresponding quick connector of a modular peripheral adapter. In certain embodiments, single quick-connect receptacle 3820 may accommodate one of the one or more quick connectors of modular peripheral adapter 500, 2600, 2700, 4300, or 4350 or other embodiments of modular peripheral adapters that may include a single quick connector or a plurality of quick connectors. In certain embodiments, modular receiver 3800 may include one or more receiver mounting holes 3830 to permit attachment of the modular receiver to a chair, desk, table, or other piece of furniture or fixed point such as a wall or ceiling. In certain embodiments, receiver mounting holes 3830 may be located in predetermined locations on the housing and may be spaced apart to correspond to standard spacings for existing components of a chair, desk, table, or other piece of furniture.

Figure 41:
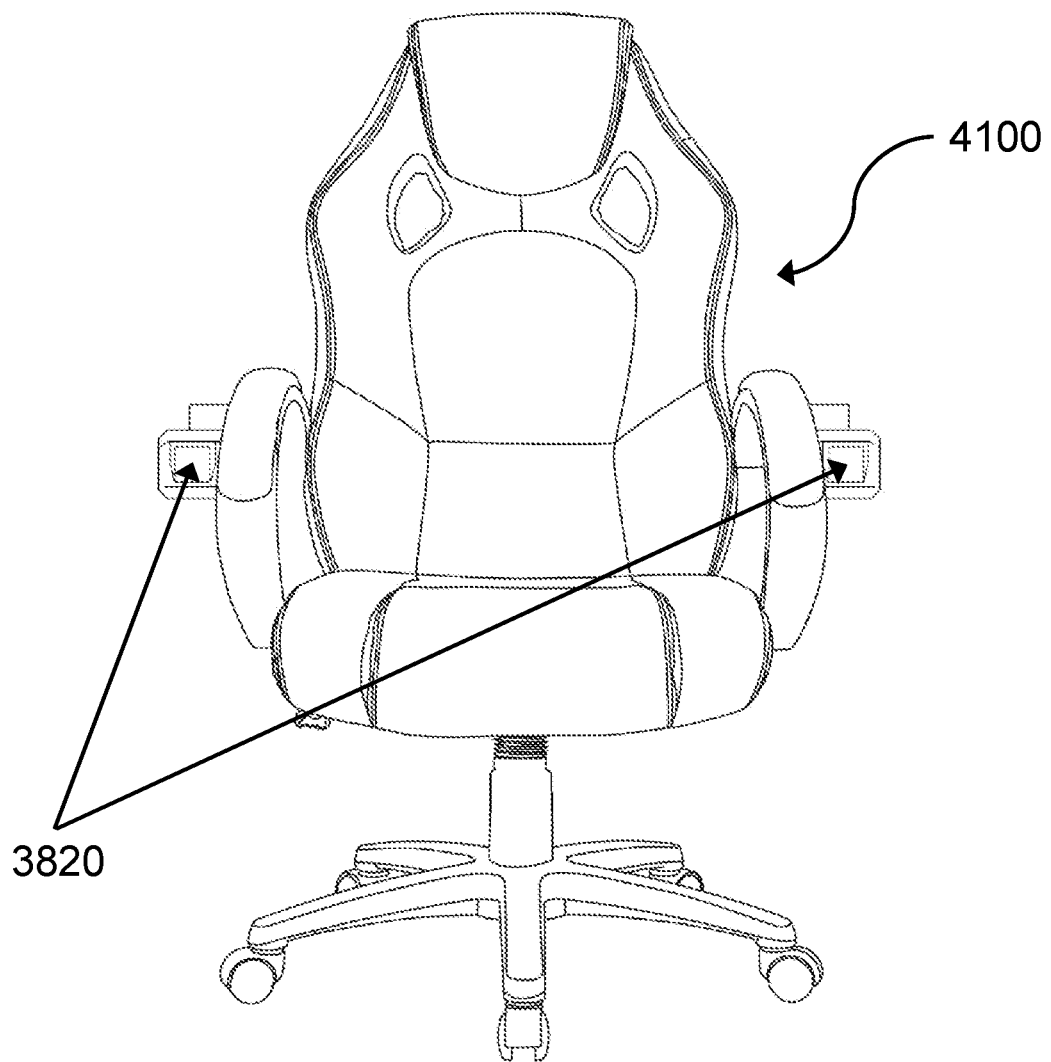
FIG. 41 depicts a front view of a chair to with two modular receivers in accordance with certain embodiments.
Figure 42:
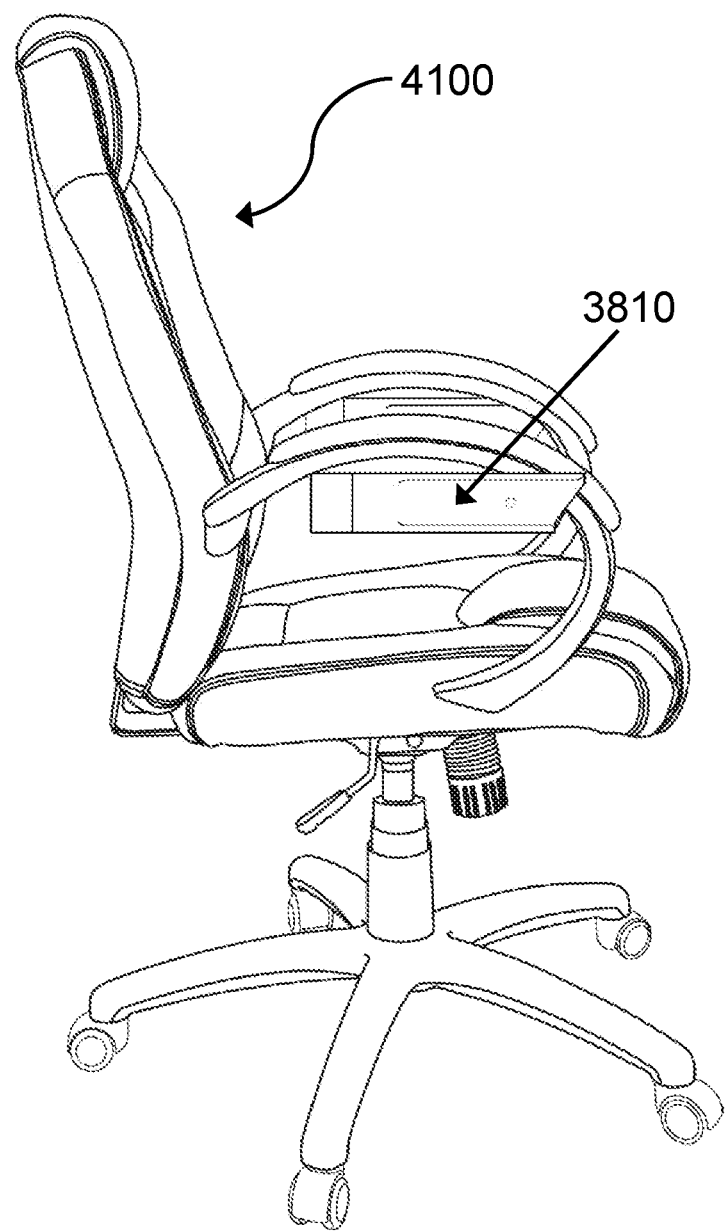
FIG. 42 depicts a side view of a chair to with two modular receivers in accordance with certain embodiments.

In certain embodiments shown in FIGS. 41-42, a chair 4100 may have an arm rest design better suited for the modular housing embodiment of modular housing 3800 shown in FIGS. 38-40 rather than the modular housing embodiment of modular housing 100 shown in FIGS. 1-4. In certain embodiments as shown in FIG. 41-42, modular receiver 3800 may be installed or built into chair 4100, so that quick-connect receptacle 3820 are disposed adjacent the arm rests of chair 4100 with the opening of quick-connect receptacles 3820 facing forward to accept a quick connector of a modular peripheral adapter.

Figure 43:
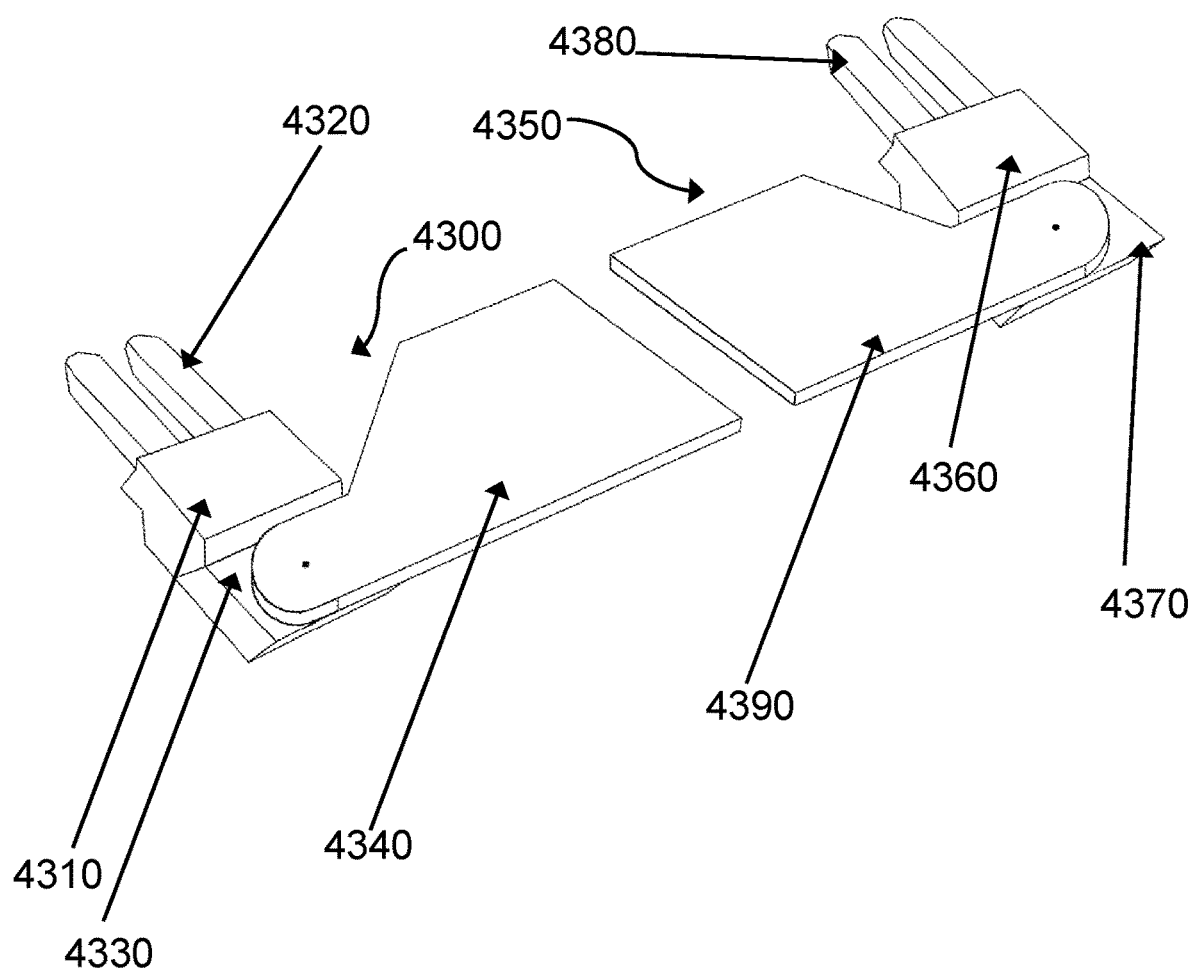
FIG. 43 depicts a perspective view of two modular peripheral adapters with desk surfaces in accordance with certain embodiments
Figure 44:
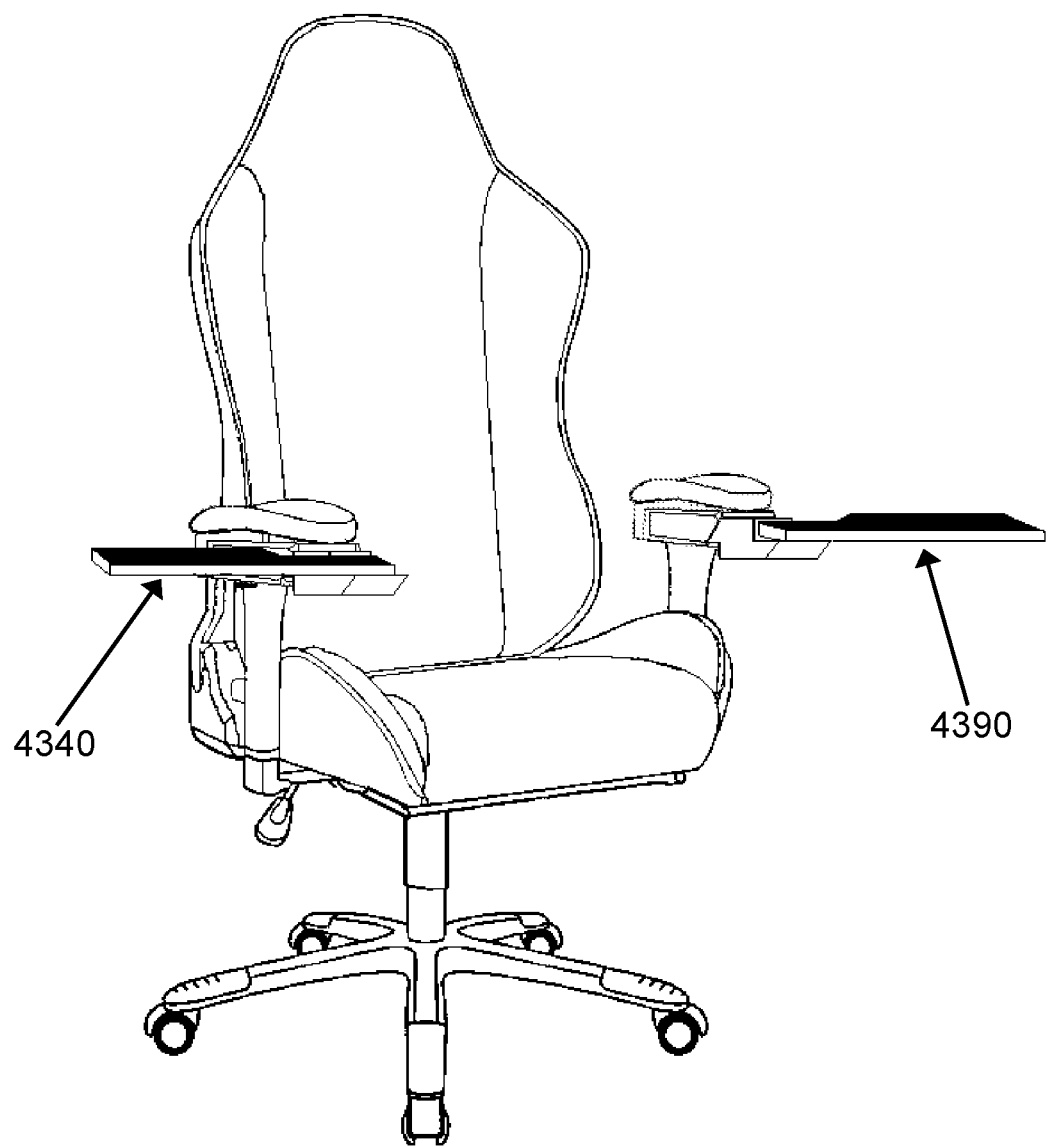
FIG. 44 depicts a perspective view a chair with the two modular peripheral adapters of FIG. 43 attached to the modular receivers attached under the left arm rest and right arm rest of the chair in accordance with certain embodiments.

In other embodiments as shown in FIGS. 43-44, a first modular peripheral adapter 4300 may include a first housing 4310 with a first side and a second side opposite the first side, and one or more quick connectors 4320 extending from the first side of housing 4310. In certain embodiments, one or more quick connectors 4320 may be adapted to slidably engage a corresponding one or more quick-connect receptacles 120 of a first modular receiver 100 attached to or built into a first arm rest of a chair to selectively connect and disconnect the modular peripheral adapter 4300 and thus any attached accessories or peripherals to or from the first modular receiver 100. In certain embodiments, first modular peripheral adapter may further comprise a first desk surface 4340 that may not be of a length sufficient to extend from a first arm rest of a chair to a second arm rest of a chair. In certain embodiments, a second modular peripheral adapter 4350 may include a first housing 4360 with a first side and a second side opposite the first side, and one or more quick connectors 4380 extending from the first side of housing 4360. In certain embodiments, one or more quick connectors 4320 may be adapted to slidably engage a corresponding one or more quick-connect receptacles 120 of a second modular receiver 100 attached to or built into a second arm rest of the chair to selectively connect and disconnect the second modular peripheral adapter 4350 and thus any attached accessories or peripherals to or from the first modular receiver 100. In certain embodiments, second modular peripheral adapter 4350 may include a second desk surface 4390 that may be long enough to extend from a second arm rest to engage the first desk surface 4340. In certain embodiments, the first desk surface 4340 and the second desk surface 4390 may slidably engage the first modular peripheral adapter 4300 and the second modular peripheral adapter 4350 respectively so that the first desk surface 4340 and/or the second desk surface 4390 may slide between a first position shown in FIG. 43 wherein the first desk surface 4340 and the second desk surface 4390 are disposed across the gap between the first arm rest and the second arm rest and a second position shown in FIG. 44 wherein the first desk surface 4340 and the second desk surface 4390 do not entirely block a gap between the first arm rest and the second arm rest to permit a user to access a seating surface of the chair without removing either the first or the second modular peripheral adapters from the chair In other embodiments the first desk surface 4340 and the second desk surface 4390 may rotatably engage the first modular peripheral adapter 4300 and the second modular peripheral adapter 4350 to allow the desk surfaces to be rotated between the first position and the second position. In certain embodiments, the second position may place the first desk surface 4340 in a position rotated 180 degrees from the first position surface as shown in FIG. 44, 90 degrees from the first position or some other angle of rotation from the first position so that a user may freely access chair 1700 without removing modular peripheral adapter 4300 from modular housing 100.

In certain embodiments, the modular nature of the modular attachment system and the ability to rapidly interchange different adapted peripheral assemblies or purpose-built peripheral assemblies at different points where modular receivers have been installed may facilitate rapid reconfiguration of a chair, desk, table, or other furniture for different applications by removing a first set of adapted peripheral assemblies or purpose-built peripheral assemblies including a first set of peripherals and/or accessories and replacing them with a second set of adapted peripheral assemblies or purpose-built peripheral assemblies including a second set of peripheral and/or accessories. In certain embodiments, a chair may be configured as a flight simulator chair by quick-connecting an adapted peripheral assembly or purpose-built peripheral assembly including a throttle peripheral to a modular receiver installed in a left arm rest and quick-connecting an adapted peripheral assembly or purpose-built peripheral assembly including a joystick to a modular receiver installed in a right arm rest. In other embodiments.

While the above description contains many specifics, these should not be construed as limitations on the scope of the invention, but rather as an exemplification of certain embodiments thereof. Embodiments include any combination or sub combination of the elements from the different species and/or embodiments disclosed herein. One skilled in the art will recognize that these features, and thus the scope of the present invention, should be interpreted in light of the following claims and any equivalents thereto.

I claim:

1. A method of quickly and toollessly connecting one or more peripherals to a chair comprising a first arm rest, a second arm rest and a first modular receiver comprising a first one or more quick-connect receptacles disposed adjacent the first arm rest, the method comprising:
    providing a first modular peripheral adapter, comprising;
        a first one or more quick connectors for toollessly engaging the first one or more quick-connect receptacles to toollessly connect the first modular peripheral adapter to the piece of furniture;
        a first platform for attaching a peripheral; and
        a desk surface rotatably attached to the first platform;
    toollessly connecting the first modular peripheral adapter to the first modular receiver by removably connecting the first one or more quick connectors to the first one or more quick-connect receptacles without the use of tools; and
    selectively rotating the desk surface between a first position wherein the desk surface is disposed across the gap between the first arm rest and the second arm rest to provide a work surface and a second position wherein the desk surface does not entirely block the gap between the first arm rest and the second arm rest to permit a user to access a seating surface of the chair without removing the modular peripheral adapter from the chair.

2. The method of claim 1, wherein the step of toollessly connecting the first modular peripheral adapter further comprises:
    attaching a peripheral to the first platform of the first modular peripheral adapter to form a first adapted peripheral assembly; and
    toollessly connecting the first adapted peripheral assembly to the piece of furniture by removably connecting the first one or more quick connectors to the first one or more quick-connect receptacles without the use of tools.

3. The method of claim 1, wherein the first one or more quick-connect receptacles are disposed below the first arm rest so that when the first modular peripheral adapter is attached to the first modular receiver, a first peripheral attached to the first platform is disposed forward of the first arm rest.

4. The method of claim 1, wherein the chair further comprises a second modular receiver comprising one or more quick-connect receptacles disposed below the second arm rest;
    wherein the first modular peripheral adapter further comprises a second one or more quick connectors spaced apart from the first one or more quick connectors; and
    wherein the method further comprises toollessly connecting the first modular peripheral adapter to the second modular receiver by removably connecting the second one or more quick connectors to the second one or more quick-connect receptacles without the use of tools to removably connect the first modular peripheral adapter to the second modular receiver such that the first platform of the first modular peripheral adapter is disposed across a gap between the first arm rest and the second arm rest.

5. The method of claim 1, wherein the chair further comprises a second modular receiver comprising a second one or more quick-connect receptacles disposed below the second arm rest; and wherein the method further comprises:
    providing a second modular peripheral adapter, the second modular peripheral adapter comprising;
    a second one or more quick connectors for engaging the second one or more quick-connect receptacles in the second modular receiver to toollessly connect the second modular peripheral adapter to the second modular receiver; and
    a second platform for attaching a second one or more peripherals; and
    toollessly connecting the second modular peripheral adapter to the second modular receiver by removably connecting the second one or more quick connectors to the second one or more quick-connect receptacles without the use of tools, whereby the second platform is disposed forward of the second arm rest.

6. The method of claim 1, wherein the first one or more quick-connect receptacles face forward to accept the first one or more quick connectors of the first modular peripheral adapter.

7. A removable modular attachment system for quickly and toollessly connecting one or more peripherals to a chair comprising a first arm rest and a second arm rest, the system comprising:
    a first modular receiver comprising a first one or more quick-connect receptacles for accommodating a corresponding first one or more quick connectors of a first modular peripheral adapter without the use of tools;
    wherein the first modular receiver is disposed adjacent the first arm rest; and
    wherein the first modular receiver is configured so that when the first modular peripheral adapter is toollessly connected to the first modular receiver, a first platform of the first modular peripheral adapter is disposed so that one or more peripherals attached to the first platform are positioned for use by a user of the piece of furniture; and
    wherein the first platform is rotatably attached to the first modular peripheral adapter to allow rotation of the first platform between a first position wherein the first platform of the first modular peripheral adapter is disposed across the gap between the first arm rest and the second arm rest and a second position wherein the first platform of the first modular peripheral adapter does not entirely block a gap between the first arm rest and the second arm rest to permit a user to access a seating surface of the chair without removing the first modular peripheral adapter from the chair.

8. The system of claim 7, wherein the first modular receiver is removably attached to the chair or built into the of chair.

9. A modular peripheral adapter for use with a removable modular attachment system for quickly and toollessly connecting one or more peripherals to a chair comprising a first arm rest and a second arm rest and a first modular receiver disposed adjacent the first arm rest, the first modular receiver comprising a first one or more quick-connect receptacles, the modular peripheral adapter comprising:

a first one or more quick connectors for engaging the first one or more quick-connect receptacles without the use of tools to toollessly connect the first modular peripheral adapter to the first modular receiver; and a first platform for attaching a peripheral;

wherein the first platform is rotatably attached to the first modular peripheral adapter to allow rotation of the first platform between a first position wherein the first platform of the first modular peripheral adapter is disposed across the gap between the first arm rest and the second arm rest and a second position wherein the first platform of the first modular peripheral adapter does not entirely block a gap between the first arm rest and the second arm rest to permit a user to access a seating surface of the chair without removing the first modular peripheral adapter from the chair.

10. The modular peripheral adapter of claim 9, wherein the peripheral comprises one of a joystick, a mouse, a keyboard, a virtual reality controller, a desk, a game controller, a steering wheel, a flight yoke, a throttle, or a computer input device.

11. The modular peripheral adapter of claim 9, wherein the first modular receiver is configured to be attached to an arm rest of the chair, a seat of the chair or a surface of the desk or the table so that when the first modular peripheral adapter is toollessly connected to the first modular receiver, a first platform of the first modular peripheral adapter is disposed so that one or more peripherals attached to the first platform are positioned for use by a user of the chair, the desk or the table.

12. The modular peripheral adapter of claim 11, further comprising a second one or more quick connectors spaced apart from the first one or more quick connectors for toollessly connecting the first modular peripheral adapter to a second modular receiver attached to the chair, the second modular receiver comprising a second one or more quick-connect receptacles, by removably connecting the second one or more quick connectors to the second one or more quick-connect receptacles without the use of tools to toollessly connect the first modular peripheral adapter to the second modular receiver.

13. The modular peripheral adapter of claim 12, the second one or more quick-connect receptacles are disposed adjacent the second arm rest such that when the first modular peripheral adapter is attached to the first modular receiver and the second modular receiver, the first platform of the first modular peripheral adapter is disposed across a gap between the first arm rest and the second arm rest.

14. The modular peripheral adapter of claim 9, wherein the first one or more quick-connect receptacles is disposed adjacent a first arm rest of the chair and the first platform is a desk surface configured to be selectively extended across a gap between the first arm rest and the second arm rest.

15. The modular peripheral adapter of claim 14, wherein the desk surface is movably attached to the first modular peripheral adapter to allow rotation or sliding of the desk surface between a first position wherein the desk surface is disposed across the gap between the first arm rest and the second arm rest and a second position wherein the desk surface does not entirely block the gap between the first arm rest and the second arm rest to permit a user to access a seating surface of the chair without removing the first modular peripheral adapter from the chair.

16. The modular peripheral adapter of claim 15, wherein the desk surface is configured to engage a second modular peripheral adapter toollessly connected to a second modular receiver disposed adjacent to a second arm rest.

* * * * *